United States Patent
Froy et al.

(10) Patent No.: US 9,773,372 B2
(45) Date of Patent: Sep. 26, 2017

(54) ENHANCED ELECTRONIC GAMING MACHINE WITH DYNAMIC GAZE DISPLAY

(71) Applicant: IGT CANADA SOLUTIONS ULC, Moncton (CA)

(72) Inventors: David Froy, Lakeville-Westmorland (CA); Edward Bowron, Shediac Bridge (CA); Reuben Dupuis, Moncton (CA); Vicky Leblanc, Moncton (CA); Karen Van Niekerk, Dieppe (CA); Aaron Corey, Moncton (CA); Stefan Keilwert, St. Josef (AT)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

(21) Appl. No.: 14/966,633

(22) Filed: Dec. 11, 2015

(65) Prior Publication Data
US 2017/0169662 A1    Jun. 15, 2017

(51) Int. Cl.
*A63F 13/00* (2014.01)
*G07F 17/32* (2006.01)
*G07F 17/34* (2006.01)

(52) U.S. Cl.
CPC ...... *G07F 17/3239* (2013.01); *G07F 17/3209* (2013.01); *G07F 17/3211* (2013.01); *G07F 17/3227* (2013.01); *G07F 17/3251* (2013.01); *G07F 17/3267* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 6,222,465 B1 | 4/2001 | Kumar et al. | |
| 7,815,507 B2 | 10/2010 | Parrott et al. | |
| 2011/0304606 A1* | 12/2011 | Walsh | G06F 3/013 345/214 |
| 2012/0105486 A1* | 5/2012 | Lankford | G06F 3/013 345/661 |
| 2012/0256967 A1* | 10/2012 | Baldwin | G06F 3/013 345/684 |
| 2012/0322542 A1* | 12/2012 | Chudd | G07F 17/3206 463/25 |

(Continued)

*Primary Examiner* — Jason Yen
(74) *Attorney, Agent, or Firm* — Sage Patent Group

(57) ABSTRACT

An electronic gaming machine where the player plays an interactive game using their player eye gaze. A graphics processor generates an interactive game environment and defines a viewing area as its subset, the viewing area having visible game components. A display device displays the viewing area having the plurality of visible game components. The display controller controls rendering of the viewing area on the display device using the graphics processor. At least one data capture camera device continuously monitors the player eye gaze to collect player eye gaze data. The game controller determines the location of the player's eye gaze relative to the viewing area and triggers a control command to the display controller. In response, the display controller controls the display device in real-time to provide a graphical animation effect displayed on the display device representative of a visual update to the visible game components in the viewing area.

20 Claims, 24 Drawing Sheets

(56) References Cited

U.S. PATENT DOCUMENTS

| | | | | |
|---|---|---|---|---|
| 2013/0267317 A1* | 10/2013 | Aoki | .................... | G07F 17/3206 463/32 |
| 2014/0292665 A1* | 10/2014 | Lathrop | .................. | G06F 3/013 345/173 |
| 2014/0323194 A1* | 10/2014 | Keilwert | ............. | G07F 17/3206 463/16 |
| 2015/0169053 A1* | 6/2015 | Bozarth | ............. | G06K 9/00604 345/156 |
| 2016/0093136 A1* | 3/2016 | Lyons | ................. | G07F 17/3206 463/21 |
| 2016/0252957 A1* | 9/2016 | Raux | ....................... | G06F 3/013 |

* cited by examiner

1200

ENHANCED ELECTRONIC GAMING MACHINE WITH DYNAMIC GAZE DISPLAY

FIELD

Embodiments described herein relate to the field of electronic gaming machines. The embodiments described herein particularly relate to the field of providing an enhanced electronic gaming machine where the player can interact with a game and display using the player's eye gaze.

INTRODUCTION

Casinos and other establishments may have video gaming terminals that may include game machines, online gaming systems (that enable users to play games using computer devices, whether desktop computers, laptops, tablet computers or smart phones), computer programs for use on a computer device (including desktop computer, laptops, tablet computers or smart phones), or gaming consoles that are connectable to a display such as a television or computer screen.

Video gaming terminals may be configured to enable users to play games with a touch interface. Example games may be a slot machine game, which may involve a reel of symbols that may move by pulling a lever to activate the reel of symbols. A user may win a prize based on the symbols displayed on the reel. In addition to slot machine games, video gaming machines may be configured to enable users to play a variety of different types of games. To interact with a game component of the game, the user may have to press a button that is part of the machine hardware, or the user may have to touch a button displayed on a display screen.

The size of a video gaming terminal may be limited by its hardware, which may limit the amount of and types of physical interactions that a user may engage in with the machine to play the game. A user may want to have different experiences at a video gaming terminal. However, since a video game terminal and its associated hardware have finite size, there may be a limit on the number of buttons or physical elements on the gaming terminal. For example, a display screen of a gaming terminal has a finite size, so a limited number of game components, buttons, or interfaces may be displayed.

There is a need to immerse the user in their gaming experience at a video gaming terminal and make more efficient use of the physical limitations of the hardware of the video gaming terminal, and therefore it is necessary to innovate by launching new and engaging game machines with improved hardware.

SUMMARY

In one aspect, there is provided an electronic gaming machine comprising a card reader to identify a monetary amount conveyed by a token to the electronic gaming machine; at least one data storage device to store game data for an interactive game; a graphics processor to generate an interactive game environment in accordance with the game data and define a viewing area as a subset of the interactive game environment, the viewing area with a plurality of visible game components; a display device to display, via a user interface, the viewing area with the plurality of visible game components; a display controller to control rendering of the viewing area on the display device using the graphics processor; at least one data capture camera device to continuously monitor eye gaze of a player to collect player eye gaze data; and a game controller for determining a location of the eye gaze of the player relative to the viewing area using the player eye gaze data and triggering a control command to the display controller to dynamically update the rendering of the viewing area based on the player eye gaze data. in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data. In response to an outcome of the interactive game, the card reader updates the monetary amount using the token.

In some embodiments, the display controller controls the display device to display a plurality of calibration symbols, wherein the at least one data capture camera device monitors calibration eye gaze of the player in relation to the calibration symbols to collect calibration data, and wherein the game controller calibrates the at least one data capture camera device and the display device based on the calibration data for the continuous monitoring.

In some embodiments, the player eye gaze data comprises a position and a focus, the position defined as coordinates of the player's eyes relative to the display device, the focus defined as a line of sight of the player's eyes relative to the display device.

In some embodiments, the game controller determines the location of the eye gaze of the player relative to the viewing area by identifying coordinates on the display device corresponding to the player eye gaze data and mapping the coordinates to the viewing area.

In some embodiments, the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

In some embodiments, the game controller predicts the location of the eye gaze of the player relative to the viewing area at a future time using the player eye gaze data and historical data from the same or other players to facilitate dynamic predictive update of the rendering of the viewing area.

In some embodiments, the at least one data capture camera device continuously monitors an area proximate to the electronic gaming machine to collect proximity data, wherein the game controller detects a location of the player relative to the electronic gaming machine based on the proximity data, and triggers the display controller to display an advertisement on the display device.

In some embodiments, the display controller renders a gaze-sensitive user interface on the display device, wherein the game controller detects the location of the eye gaze of the player relative to the gaze-sensitive user interface using the player eye gaze data, and triggers the display controller to dynamically update the rendering of the gaze-sensitive user interface to provide a real-time or near real-time graphical animation effect displayed on the display device representative of a visual update to the gaze-sensitive user interface.

In some embodiments, the graphics processor generates left and right eye images based on a selected three-dimensional intensity level, wherein the display device is a stereoscopic display device, and wherein the game controller triggers the control command to the display controller to dynamically update the rendering of the of the left and right eye images based on the player eye gaze data.

In some embodiments, the graphical animation effect and the visual update focuses on a portion of the visible game components and blurs another portion of the visible game elements.

In some embodiments, the graphical animation effect and the visual update displays at least a portion of the visible game components in greater detail or higher resolution.

In some embodiments, the graphical animation effect and the visual update magnifies a portion of the visible game components.

In some embodiments, the viewing area has a plurality of invisible game components, and wherein the graphical animation effect and the visual update renders visible at least a portion of the invisible game components.

In some embodiments, the graphical animation effect and the visual update distorts a portion of the viewing area.

In some embodiments, the graphical animation effect and the visual update distorts a portion of the visible game components.

In some embodiments, the graphical animation effect and the visual update hides a portion of the visible game components.

In some embodiments, the graphical animation effect and the visual update selects a portion of the visible game components.

In some embodiments, the graphical animation effect and the visual update is representative of a magnetic attraction towards the location of the eye gaze of the player relative to the viewing area.

In some embodiments, the at least one data capture camera device continuously monitors an eye gesture of the player to collect player eye gesture data, and wherein the game controller triggers the control command to the display controller to dynamically update the rendering of the viewing area based on the player eye gesture data using the graphical animation effect to update the visible game components in the viewing area.

In some embodiments, the interactive game environment provides a reel space of a matrix of game symbols, wherein the rendering of the viewing area involves a spin animation of the reel space, and wherein the graphical animation effect involves slowing the spin animation or moving the reel space.

In some embodiments, the at least one data storage device stores game data for at least one interactive bonus game, wherein the interactive game environment provides a reel space of a matrix of game symbols, wherein each reel space has a tile behind the reel space, wherein the rendering of the viewing area involves a spin animation of the reel space, and wherein the graphical animation effect involves breaking the tile behind each reel space to trigger the interactive bonus game.

In some embodiments, the at least one data storage device stores game data for at least one bonus game, and wherein the game controller triggers the control command to the display controller to transition from the interactive game to the at least one bonus game based on player eye gaze data using the graphical animation effect.

In some embodiments, the at least one data storage device stores game data for at least one bonus game, and wherein the game controller triggers the control command to the display controller to dynamically update the rendering of the viewing area to provide a real-time or near real-time graphical animation effect displayed on the display device representative of a visual update to the visible game components of the bonus game in the viewing area, the visual update based on the player eye gaze data.

In some embodiments, the at least one data capture camera device continuously monitors player movement to collect player movement data, wherein the game controller detects the player movement relative to the viewing area using the player movement data, and triggers the control command to the display controller to dynamically update the rendering of the viewing area based on the player movement data using the graphical animation effect to update the visible game components in the viewing area.

In some embodiments, the player movement data is associated with movement of the player's head.

In some embodiments, the player movement data is associated with movement of a part of the player's body.

In some embodiments, the player movement data is associated with a gesture by the player.

In another aspect, there is provided an electronic gaming machine comprising a card reader to identify a monetary amount conveyed by a token to the electronic gaming machine; at least one data storage device to store game data for a plurality of interactive games; a graphics processor to generate an interactive game environment using the game data and define a viewing area as a subset of the interactive game environment, the viewing area having one or more game selector symbols for the plurality of interactive games; a display device to display via a user interface the viewing area having the one or more game selector symbols; a display controller to control rendering of the viewing area of the selected game on the display device using the graphics processor; at least one data capture camera device to continuously monitor eye gaze of a player to collect player eye gaze data; and a game controller for determining a location of the eye gaze of the player relative to the viewing area using the player eye gaze data and triggering a control command to the display controller to dynamically update the rendering of the viewing area based on the player eye gaze data. In response to the control command, the display controller controls the display device in real-time or near real-time using the graphics processor to dynamically update the rendering of the viewing area to provide a real-time or near real-time graphical animation effect displayed on the display device representative of a visual update corresponding to selecting one of the game selector symbols in the viewing area and displaying a selected interactive game for the selected game selector symbol, the visual update based on the player eye gaze data. In response to an outcome of the selected interactive game, the card reader updates the monetary amount using the token.

In some embodiments, the player eye gaze data corresponds to a direction and the graphical animation effect displayed on the display device representative of the visual update corresponds to scrolling in the direction to reveal additional game selector symbols for selection as the selected game selector symbol.

In some embodiments, the display controller controls the display device to display a plurality of calibration symbols, wherein the at least one data capture camera device monitors calibration eye gaze of the player in relation to the calibration symbols to collect calibration data, and wherein the game controller calibrates the at least one data capture camera device and the display device based on the calibration data for the continuous monitoring.

In some embodiments, the player eye gaze data comprises a position and a focus, the position defined as coordinates of the player's eyes relative to the display device, the focus defined as a line of sight of the player's eyes relative to the display device.

In some embodiments, the game controller determines the location of the eye gaze of the player relative to the viewing area by identifying coordinates on the display device corresponding to the player eye gaze data and mapping the coordinates to the viewing area.

In some embodiments, the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

In some embodiments, the game controller predicts the location of the eye gaze of the player relative to the viewing area at a future time using the player eye gaze data and historical data from the same or other players to facilitate dynamic predictive update of the rendering of the viewing area.

In some embodiments, the at least one data capture camera device continuously monitors an area proximate to the electronic gaming machine to collect proximity data, wherein the game controller detects a location of the player relative to the electronic gaming machine based on the proximity data, and triggers the display controller to display an advertisement on the display device.

In some embodiments, the display controller renders a gaze-sensitive user interface on the display device, wherein the game controller detects the location of the eye gaze of the player relative to the gaze-sensitive user interface using the player eye gaze data, and triggers the display controller to dynamically update the rendering of the gaze-sensitive user interface to provide a real-time or near real-time graphical animation effect displayed on the display device representative of a visual update to the gaze-sensitive user interface.

In some embodiments, the graphics processor generates left and right eye images based on a selected three-dimensional intensity level, wherein the display device is a stereoscopic display device, and wherein the game controller triggers the control command to the display controller to dynamically update the rendering of the of the left and right eye images based on the player eye gaze data.

In some embodiments, the at least one data capture camera device continuously monitors an eye gesture of the player to collect player eye gesture data, and wherein the game controller triggers the control command to the display controller to dynamically update the rendering of the viewing area based on the player eye gesture data using the graphical animation effect to select one of the game selector symbols in the viewing area and to display a selected interactive game for the selected game selector symbol, the visual update based on the player eye gesture data.

In some embodiments, the at least one data capture camera device continuously monitors player movement to collect player movement data, wherein the game controller detects the player movement relative to the viewing area using the player movement data, and triggers the control command to the display controller to dynamically update the rendering of the viewing area based on the player movement data using the graphical animation effect to select one of the game selector symbols in the viewing area and to display a selected interactive game for the selected game selector symbol, the visual update based on the player movement data.

In some embodiments, the player movement data is associated with movement of the player's head.

In some embodiments, the player movement data is associated with movement of a part of the player's body.

In some embodiments, the player movement data is associated with a gesture by the player.

In another aspect, there is provided an electronic gaming machine comprising a card reader to identify a monetary amount conveyed by a token to the electronic gaming machine; at least one data storage device to store game data for an interactive game; a graphics processor to generate an interactive game environment using the game data and define a viewing area as a first portion of the interactive game environment, the viewing area representing a virtual camera view of the interactive game environment; a display device to display via a user interface the viewing area; a display controller to control rendering of the viewing area on the display device using the graphics processor; at least one data capture camera device to continuously monitor eye gaze of a player to collect player eye gaze data; and a game controller for determining a location of the eye gaze of the player relative to the viewing area using the player eye gaze data and triggering a control command to the display controller to dynamically update the rendering of the viewing area based on the player eye gaze data. In response to the control command, the display controller controls the display device in real-time or near real-time using the graphics processor to dynamically update the rendering of the viewing area in real-time or near real-time to navigate to a second portion of the interactive game environment, wherein the update comprises a graphical animation effect displayed on the display device representative of navigating from the first portion to the second portion of the interactive game environment, the update based on the player eye gaze data. In response to an outcome of the interactive game, the card reader updates the monetary amount using the token.

In some embodiments, the player eye gaze data corresponds to a camera angle for the virtual camera view of the interactive game environment and the graphical animation effect displayed on the display device representative of navigating from the first portion to the second portion is based on the camera angle to update the virtual camera view of the interactive game environment.

In some embodiments, the display controller controls the display device to display a plurality of calibration symbols, wherein the at least one data capture camera device monitors calibration eye gaze of the player in relation to the calibration symbols to collect calibration data, and wherein the game controller calibrates the at least one data capture camera device and the display device based on the calibration data for the continuous monitoring.

In some embodiments, the player eye gaze data comprises a position and a focus, the position defined as coordinates of the player's eyes relative to the display device, the focus defined as a line of sight of the player's eyes relative to the display device.

In some embodiments, the game controller determines the location of the eye gaze of the player relative to the viewing area by identifying coordinates on the display device corresponding to the player eye gaze data and mapping the coordinates to the viewing area.

In some embodiments, the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

In some embodiments, the game controller predicts the location of the eye gaze of the player relative to the viewing area at a future time using the player eye gaze data and historical data from the same or other players to facilitate dynamic predictive update of the rendering of the viewing area.

In some embodiments, the at least one data capture camera device continuously monitors an area proximate to the electronic gaming machine to collect proximity data, wherein the game controller detects a location of the player relative to the electronic gaming machine based on the proximity data, and triggers the display controller to display an advertisement on the display device.

In some embodiments, the display controller renders a gaze-sensitive user interface on the display device, wherein the game controller detects the location of the eye gaze of the player relative to the gaze-sensitive user interface using the player eye gaze data, and triggers the display controller to dynamically update the rendering of the gaze-sensitive user interface to provide a real-time or near real-time graphical animation effect displayed on the display device representative of a visual update to the gaze-sensitive user interface.

In some embodiments, the graphics processor generates left and right eye images based on a selected three-dimensional intensity level, wherein the display device is a stereoscopic display device, and wherein the game controller triggers the control command to the display controller to dynamically update the rendering of the of the left and right eye images based on the player eye gaze data.

In some embodiments, the at least one data capture camera device continuously monitors an eye gesture of the player to collect player eye gesture data, and wherein the game controller triggers the control command to the display controller to dynamically update the rendering of the viewing area based on the player eye gesture data using the graphical animation effect to navigate from the first portion of the interactive game environment to the second portion of the interactive game environment.

In some embodiments, the at least one data capture camera device continuously monitors player movement to collect player movement data, wherein the game controller detects the player movement relative to the viewing area using the player movement data, and triggers the control command to the display controller to dynamically update the rendering of the viewing area based on the player movement data using the graphical animation effect to navigate from the first portion of the interactive game environment to the second portion of the interactive game environment.

In some embodiments, the player movement data is associated with movement of the player's head.

In some embodiments, the player movement data is associated with movement of a part of the player's body.

In some embodiments, the player movement data is associated with a gesture by the player.

Further features and combinations thereof concerning embodiments are described.

DETAILED DESCRIPTION

Figure 1:
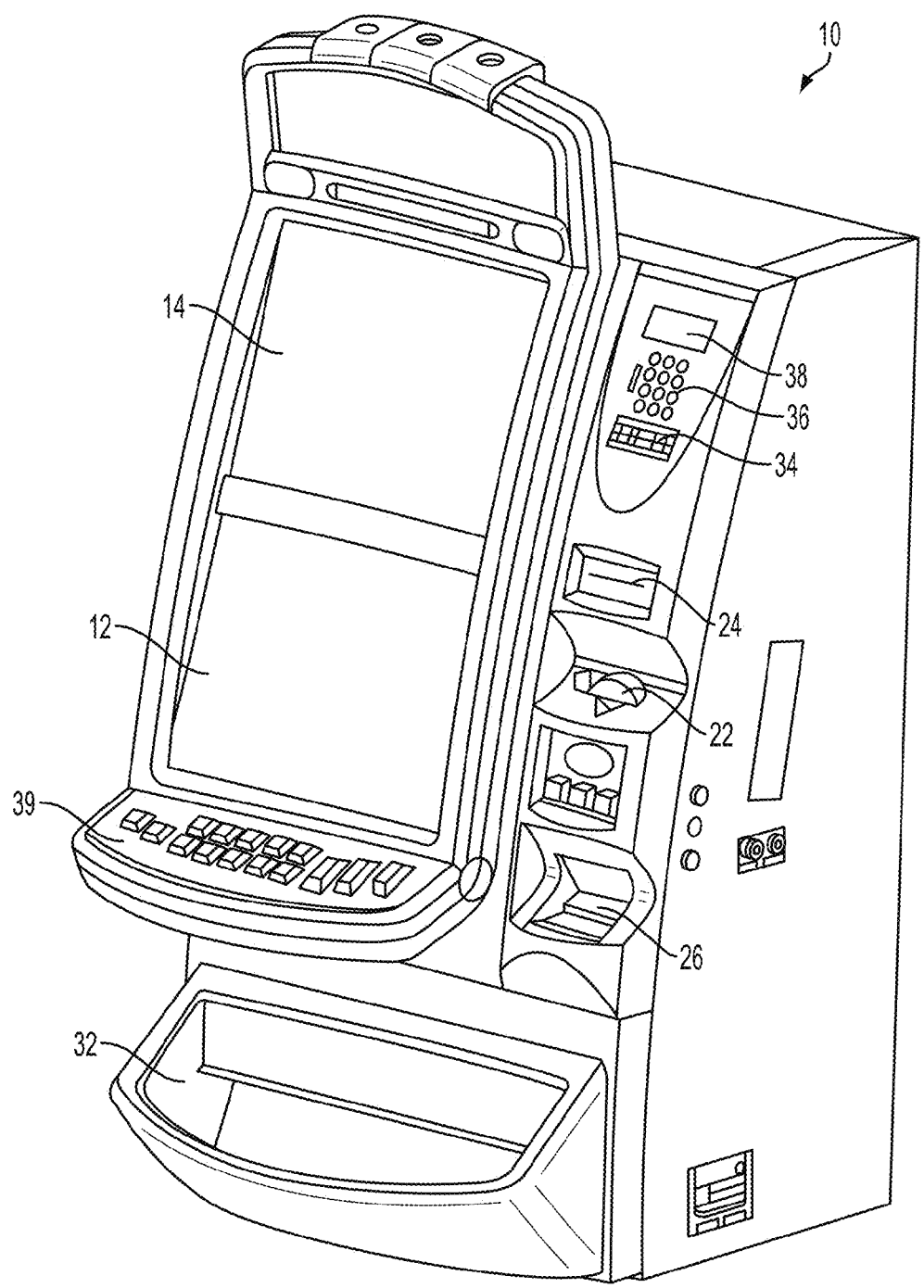
FIG. 1 is a perspective view of an electronic gaming machine for implementing the gaming enhancements according to some embodiments.

Embodiments described herein relate to an enhanced electronic gaming machine (EGM) where the player can play an interactive game using their eye gaze. The EGM may include at least one data capture camera device to continuously monitor the eye gaze of the player to collect player eye gaze data. The EGM may have a card reader to identify the amount of money that a player conveys to the EGM. The graphics processor of the EGM may be configured to generate an interactive game environment using the game data of an interactive game. The display device of the EGM may display a viewing area, which may be a portion of the interactive game environment. The EGM may have a game controller that can determine the location of the eye gaze of the player relative to the viewing area by mapping the location of the player eye gaze on the display device to the viewing area. The game controller may trigger a control command to the display controller of the EGM to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device to update the visible game components in the viewing area based on the player eye gaze data. Depending on the outcome of the interactive game, the card reader may update the monetary amount.

The EGM may include one or more data capture camera devices that may be configured with algorithms to process recorded image data to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM. A player may maintain the position of the player's eyes while focusing on different areas of a display device of the EGM. A player may maintain the focus of the player's eye gaze on the same portion of a display device of the EGM while changing the position of their eyes.

The EGM may monitor the player eye gaze on the viewing area by mapping the player eye gaze on the display device to the viewing area. The EGM may dynamically update and render the viewing area in 2D or 3D. The player may play an interactive game using only the eye gaze of the player. In some embodiments, the player may play an interactive game using their eye gaze, eye gesture, movement, or any combination thereof.

The gaming enhancements described herein may be carried out using a physical EGM. EGM may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade. One example type of EGM is described with respect to FIG. 1.

FIG. 1 is a perspective view of an EGM 10 configured to continuously monitor eye gaze of a player to collect player eye gaze data. A game controller may determine a location of the eye gaze of the player relative to a viewing area of the interactive game environment using the player eye gaze data and triggering a control command to a display controller to dynamically update the rendering of the viewing area based on the player eye gaze data. EGM 10 has at least one data storage device to store game data for an interactive game. The data storage device may store game data for one or more primary interactive games and one or more bonus interactive games. EGM 10 may have the display controller for detecting the control command to dynamically update the rendering of the viewing area to provide a real-time or near real-time graphical animation effect displayed on the display device representative of a visual update to one or more visible game components that may be in the viewing area.

An example embodiment of EGM 10 includes a display device 12 that may be a thin film transistor (TFT) display, a liquid crystal display (LCD), a cathode ray tube (CRT), auto stereoscopic 3D display and LED display, an OLED display, or any other type of display. An optional second display device 14 provides game data or other information in addition to display device 12. Display device 12, 14, may have 2D display capabilities or 3D display capabilities, or both. Gaming display device 14 may provide static information, such as an advertisement for the game, the rules of the game, pay tables, pay lines, or other information, or may even display the main game or a bonus game along with display device 12. Alternatively, the area for display device 14 may be a display glass for conveying information about the game. Display device 12, 14 may also include a camera, sensor, and other hardware input devices. Display device 12, 14 may display at least a portion of the visible game components of an interactive game.

In some embodiments, the display device 12, 14 may be a touch sensitive display device. The player may interact with the display device 12, 14 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the display device 12, 14. As another example, the player may not have to touch the display device 12, 14 to play the interactive game. The player may instead interact with the interactive game using their eye gaze, eye gestures, and/or body movements.

EGM 10 may include a player input device or a data capture camera device to continuously detect and monitor player interaction commands (e.g. eye gaze, eye gestures, player movement, touch, gestures) to interact with the viewing area and game components displayed on the display device 12, 14. EGM 10 has a game controller for determining a location of the eye gaze of the player relative to the viewing area using the player eye gaze data collected by the at least one data capture camera device, which may continuously monitor eye gaze of a player. The game controller may trigger a control command to the display controller to dynamically update the rendering of the viewing area based on the player eye gaze data. In response to the control command, the display controller may control the display device in real-time or near real-time using the graphics processor to dynamically update the rendering of the viewing area to provide a real-time or near real-time graphical animation effect displayed on the display device that may represent a visual update to the visible game components in the viewing area, the visual update based on the player eye gaze data. In some embodiments, the control command may be based on the eye gaze, eye gesture, or the movement of the player, or any combination thereof. The eye gaze of the player may be the location on the display device where the player is looking. The eye gesture of the player may be the gesture made by the player using one or more eyes, such as widening the eyes, narrowing the eyes, blinking, and opening one eye and closing the other. The movement of the player may be the movement of the player's body, which may include head movement, hand movement, chest movement, leg movement, foot movement, or any combination thereof. A winning outcome of the game for provision of an award may be triggered based on the eye gaze, eye gesture, or the movement of the player. For example, by looking at a game component displayed by the display controller on the display device 12, 14 for a pre-determined period of time, the player may trigger a winning outcome. The award may include credits, free games, mega pot, small pot, progressive pot, and so on.

Display device 12, 14 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A processor of EGM 10 associates this X-Y location with a function to be performed. Such touch screens may be used for slot machines, for example, or other types of gaming machines. There may be an upper and lower multi-touch screen in accordance with some embodiments. One or both of display device 12, 14 may be configured to have auto stereoscopic 3D functionality to provide 3D enhancements to the interactive game environment. The touch location positions may be 3D, for example, and mapped to at least one visible game component of the plurality of visible game components.

A coin slot 22 may accept coins or tokens in one or more denominations to generate credits within EGM 10 for playing games. An input slot 24 for an optical reader and printer receives machine readable printed tickets and outputs printed tickets for use in cashless gaming. An output slot 26 may be provided for outputting various physical indicia, such as physical tokens, receipts, bar codes, etc.

A coin tray 32 may receive coins or tokens from a hopper upon a win or upon the player cashing out. However, the EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may read from various types of cards, such as smart cards, magnetic strip cards, or other types of cards conveying machine readable information. The card reader reads the inserted card for player and credit information for cashless gaming. Card reader slot 34 may read a magnetic code on a conventional player tracking card, where the code uniquely identifies the player to a host system at the venue. The code is cross-referenced by the host system to any data related to the player, and such data may affect the games offered to the player by the gaming terminal. Card reader slot 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader slot 34 may be implemented in different ways for various embodiments. The card reader slot 34 may be an electronic reading device such as a player tracking card reader, a ticket reader, a banknote detector, a coin detector, and any other input device that can read an instrument supplied by the player for conveying a monetary amount. In the case of a tracking card, the card reader slot 34 detects the player's stored bank and applies that to the gaming machine being played. The card reader slot 34 or reading device may be an optical reader, a magnetic reader, or other type of reader. The card reader slot 34 may have a slot provided in the gaming machine for receiving the instrument. The card reader slot 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

Keypad 36 may be an input device such as a touchscreen, or dynamic digital button panel, in accordance with some embodiments.

Player control buttons 39 may include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

EGM 10 may also include a digital button panel. The digital button panel may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

EGM 10 may also include hardware configured to provide eye, motion or gesture tracking. For example, the EGM 10 may include at least one data capture camera device, which may be one or more cameras that detect one or more spectra of light, one or more sensors (e.g. optical sensor), or a combination thereof. The at least one data capture camera device may be used for eye, gesture or motion tracking of player, such as detecting eye movement, eye gestures, player positions and movements, and generating signals defining x, y and z coordinates. For example, the at least one data capture camera device may be used to implement tracking recognition techniques to collect player eye gaze data, player eye gesture data, and player movement data. An example type of motion tracking is optical motion tracking. The motion tracking may include a body and head controller. The motion tracking may also include an eye controller. EGM 10 may implement eye-tracking recognition technology using cameras, sensors (e.g. optical sensor), data receivers and other electronic hardware to capture various forms of player input. The eye gaze, eye gesture, or motion by a player may interact with the interactive game environment or may impact the type of graphical animation effect. Accordingly, EGM 10 may be configured to capture player eye gaze input, eye gesture input, and movement input as player interaction commands.

For example, the player eye gaze data, player eye gesture data, and player movement data defining eye movement, eye gestures, player positions and movements may be used to select, manipulate, or move game components. As another example, the player eye gaze data, player eye gesture data, and player movement data defining eye movement, eye gestures, player positions and movements may be used to change a view of the gaming surface or gaming component. A visible game component of the game may be illustrated as a three-dimensional enhancement coming towards the player. Another visible game component of the game may be illustrated as a three-dimensional enhancement moving away from the player. The player's head position may be used as a view guide for the at least one data capture camera device during a three-dimensional enhancement. A player sitting directly in front of display 12, 14 may see a different view than a player moving aside. The at least one data capture camera device may also be used to detect occupancy of the machine or detect movement proximate to the machine.

Embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, EGM 10 is particularly configured to provide an interactive game environment. The display device 12, 14 may display, via a user interface, the interactive game environment and the viewing area having one or more game components in accordance with a set of game data stored in a data store. The interactive game environment may be a 2D interactive game environment or a 3D interactive game environment, or a combination thereof.

A data capture camera device may capture player data, such as button input, gesture input and so on. The data capture camera device may include a camera, a sensor or other data capture electronic hardware. In some embodiments, EGM 10 may include at least one data capture camera device to continuously monitor the eye gaze of a player to collect player eye gaze data. The player may provide input to the EGM 10 using the eye gaze of the player. For example, using the eye gaze of the player, which may be collected as player eye gaze data, the player may select an interactive game to play, interact with a game component, or trigger a bonus interactive game.

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As described herein, EGM 10 may be configured to provide an interactive game environment. The interactive game environment may be a 2D or 3D interactive game environment. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 12, 14. The interactive game environment or the viewing area may be dynamically updated based on the eye gaze, eye gesture, or movement of the player in real-time or near real-time. The update to the interactive game environment or the viewing area may be a graphical animation effect displayed on the display device 12, 14. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 10.

For an interactive game environment, the EGM 10 may include a display device 12, 14 with auto stereoscopic 3D functionality. The EGM 10 may include a touch screen display for receiving touch input data to define player interaction commands. The EGM 10 may also include at least one data capture camera device, for example, to further receive player input to define player interaction commands. The EGM 10 may also include several effects and frame lights. The 3D enhancements may be an interactive game environment for additional game symbols.

EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

EGM 10 may also include a plurality of effects lights and frame lights. The lights may be synchronized with enhancements of the game. The EGM 10 may be configured to control color and brightness of lights. Additional custom animations (color cycle, blinking, etc.) may also be configured by EGM 10. The custom animations may be triggered by certain gaming events.

Figure 2A:
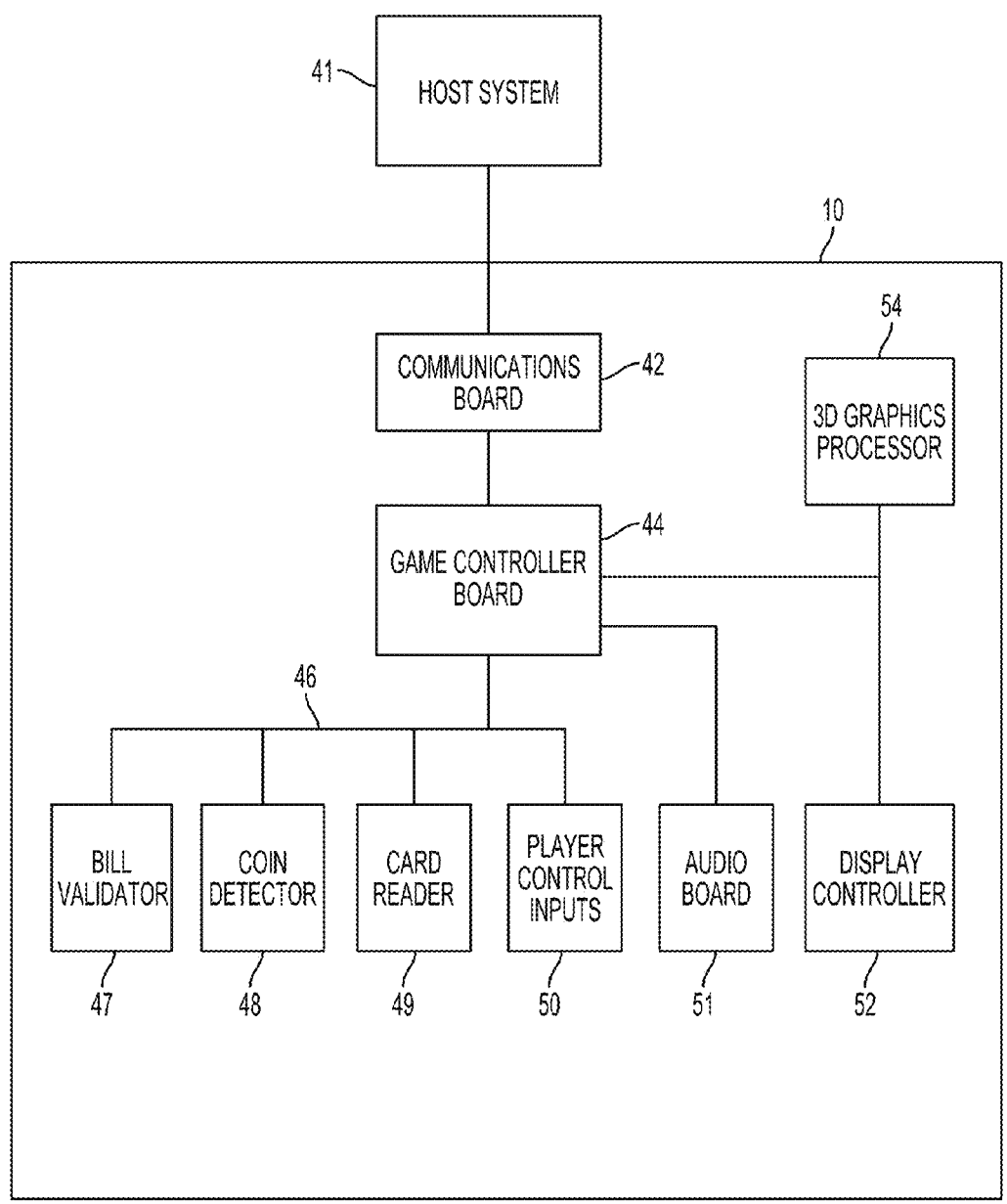
FIG. 2A is a schematic diagram of an electronic gaming machine linked to a casino host system according to some embodiments.

FIG. 2A is a block diagram of hardware components of EGM 10 according to some embodiments. EGM 10 is shown linked to the casino's host system 41 via network infrastructure. These hardware components are particularly configured to provide at least one interactive game. These hardware components may be configured to provide at least one interactive game and at least one bonus game.

A communications board 42 may contain circuitry for coupling the EGM 10 to network. Communications board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. EGM 10 may communicate over a network using a suitable protocol, such as the G2S protocols.

Communications board 42 communicates, transmits and receives data using a wireless transmitter, or it may be wired to a network, such as a local area network running throughout the casino floor, for example. Communications board 42 may set up a communication link with a master controller and may buffer data between the network and game controller board 44. Communications board 42 may also communicate with a network server, such as in accordance with the G2S standard, for exchanging information to carry out embodiments described herein.

Game controller board 44 includes memory and a processor for carrying out program instructions stored in the memory and for providing the information requested by the network. Game controller board 44 executes game routines using game data stores in a data store accessible to the game controller board 44, and cooperates with graphics processor 54 and display controller 52 to provide games with enhanced interactive game components.

EGM 10 may include at least one data capture camera device for implementing the gaming enhancements, in accordance with some embodiments. The EGM 10 may include the at least one data capture camera device, one or more sensors (e.g. optical sensor), or other hardware device configured to capture and collect in real-time or near real-time data relating to the eye gaze, eye gesture, or movement of the player, or any combination thereof.

In some embodiments, the at least one data capture camera device may be used for eye gaze tracking, eye gesture tracking, motion tracking, and movement recognition. The at least one data capture camera device may collect data defining x, y and z coordinates representing eye gaze, eye gestures, and movement of the player.

In some examples, a game component may be illustrated as a 3D enhancement coming towards the player. Another game component may be illustrated as a 3D enhancement moving away from the player. The player's head position may be used as a reference for the at least one data capture camera device during a 3D enhancement. A player sitting directly in front of display 12, 14 may see a different view than a player moving aside. The at least one data capture camera device may also be used to detect occupancy of the EGM 10 or detect movement proximate to the EGM 10. The at least one data capture camera device and/or a sensor (e.g. an optical sensor) may also be configured to detect and track the position(s) of a player's eyes or more precisely, pupils, relative to the screen of the EGM 10.

The at least one data capture camera device may also be used to collect data defining player eye movement, eye gestures, body gestures, head movement, or other body movement. Players may move their eyes, their bodies or portions of their body to interact with the interactive game. The at least one data capture camera device may collect data defining player eye movement, eye gestures, body gestures, head movement, or other body movement, process and transform the data into data defining game interactions (e.g. selecting game components, focusing game components, magnifying game components, movement for game components), and update the rendering of the viewing area to provide a real-time or near real-time graphical animation effect representative of the game interactions using the player eye gaze data, player eye gesture data, player movement data, or any combination thereof. For example, the player's eyes may be tracked by the at least one data capture camera device (or another hardware component of EGM 10), so when the player's eyes move left, right, up or down, one or more game components on display device 12, 14, may move in response to the player's eye movements. The player may have to avoid obstacles, or possibly catch or contact items to collect depending on the type of game. These movements within the game may be implemented based on the data derived from collected player eye gaze data, player eye gesture data, player movement data, or any combination thereof.

In some embodiments, the at least one data capture camera device may track a position of each eye of a player relative to display device 12, 14, as well as a direction of focus of the eyes and a point of focus on the display device 12, 14, in real-time or near real-time. The focus direction may be the direction at which the player's line of sight travels or extends from his or her eyes to display device 12, 14. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the at least one data capture camera device may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

A game component may be selected to move or manipulate with the player's eye movements. The gaming component may be selected by the player or by the game. For example, the game outcome or state may determine which symbol to select for enhancement.

As previously described, the at least one data capture camera device may track a position of a player's eyes relative to display device 12, 14, as well as a focus direction and a focus point on the display device 12, 14 of the player's eyes in real-time or near real-time. The focus direction can be the direction at which the player's line of sight travels or extends from his or her eyes to the display device 12, 14. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12, 14 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The player eye gaze data and player eye gesture data may relate to the movement of the player's eyes. For example, the player's eyes may move or look to the left, which may trigger a corresponding movement of a game component within the game. The movement of the player's eyes may also trigger an updated view of the entire interactive game on the display device 12, 14 to reflect the orientation of the player in relation to the display device 12, 14. The player movement data may be associated with movement of the body of the player, such as the player's head, arms legs, or other part of the player's body. As a further example, the player movement data may be associated with a gesture made by the player, such as a gesture by a hand or a finger.

In one embodiment of the invention, the EGM 10 may be configured to target, select, deselect, move, or rotate one or more game components based on player eye gaze data, player eye gesture data, and player movement data. For example, the EGM 10 may determine that a player has gazed at (e.g. the focus point has remained more or less constant) a previously unselected game component for three or more seconds, then the EGM 10 may select or highlight the game component, so the player may know that he or she may proceed to move or rotate the selected or highlighted game component. In another example, the EGM 10 may determine that after a player has selected a game component, the same player has moved his or her eyes to the right on a horizontal level for a predetermined length or period of time, then the EGM 10 may cause the selected game component to move to the right as well on a horizontal level. Similarly, the EGM 10 may determine that the player has moved his or her eyes down on a vertical level for a predetermined length or period of time, and then the EGM 10 may cause the selected game component to move to the bottom vertically.

Display controller 52 may control one or more of display device 12, 14 using graphics processor 54 to display a viewing area that may include one or more visible game components based on the game data of an interactive game.

Display controller 52 may, in response to detection of the control command from the game controller 44 based on the player eye gaze data, player eye gesture data, or player movement data, control display device 12, 14 using graphics processor 54. Display controller 52 may update the viewing area to trigger a graphical animation effect displayed on one or both of display device 12, 14 representative of a visual update to the visible game components in the viewing area, the visual update based on the player eye gaze data, player eye gesture data, or player movement data.

In some embodiments, the at least one data capture camera device and the display device 12, 14 may be calibrated. Calibration of the at least one data capture camera device and the display device may be desirable because the eyes of each player using the EGM 10 may be physically different, such as the shape and location of the player's eyes, and the capability for each player to see. Each player may also stand at a different position relative to the EGM 10.

The at least one data capture camera device may be calibrated by the game controller 44 by detecting the movement of the player's eyes. In some embodiments, the display controller 52 may control the display device 12, 14 to display one or more calibration symbols. There may be one calibration symbol that appears on the display device 12, 14 at one time, or more than one calibration symbol may appear on the display device 12, 14 at one time. The player may be prompted by text, noise, graphical animation effect, or any combination thereof, to direct their eye gaze to one or more of the calibration symbols. The at least one data capture camera device may monitor the eye gaze of the player looking at the one or more calibration symbols and a distance of the player's eyes relative to the EGM 10 to collect calibration data. Based on the eye gaze corresponding to the player looking at different calibration symbols, the at least one data capture camera device may record data associated with how the player's eyes rotate to look from one position on the display device 12, 14 to a second position on the display device 12, 14. The game controller 44 may calibrate the at least one data capture camera device based on the calibration data.

Figure 3:
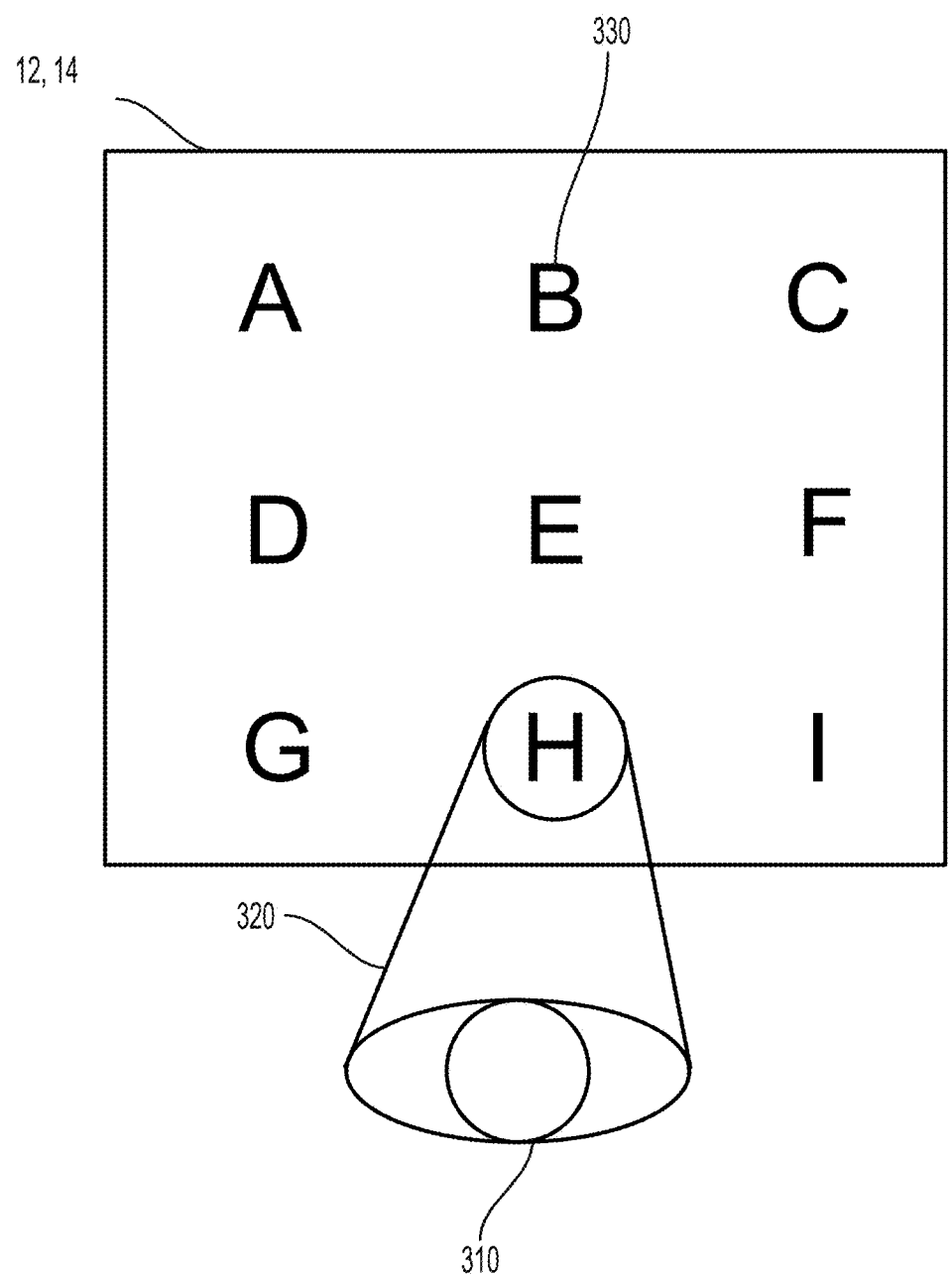
FIG. 3 is a schematic diagram illustrating a calibration process for the electronic gaming machine according to some embodiments.

For example, as shown in FIG. 3, before the player 310 plays the interactive game, the EGM 10 may notify the player 310 that the at least one data capture camera device (not shown) and the display device 12, 14 may be calibrated. The display controller 52 may cause the display device 12, 14 to display one or more calibration symbols 330. In FIG. 3, nine calibration symbols 330 "A" through "I" are displayed, but the calibration symbols 330 may be any other symbols. For example, the calibration symbols 330 may be one or more game components related to the interactive game to be played. The calibration symbols 330 may be displayed on any portion of the display device 12, 14. The player 310 may be prompted to look at the calibration symbols in a certain order. The at least one data capture camera device may monitor the eye gaze 320 of the player 310 looking at the calibration symbols 330 and the distance of the player's eyes relative to the EGM 10 to collect the calibration data. When the at least one data capture camera device collects player eye gaze data in real-time, the game controller 44 may compare the player eye gaze data with the calibration data in real-time to determine the angle at which that the player's eyes are looking.

The display controller 52 may calibrate the display device 12, 14 using the graphics processor 54 based on the calibration data collected by the at least one data capture camera device. The at least one data capture camera device may monitor the eye gaze of the player to collect calibration data as described herein. The display controller 52 may calibrate the display device 12, 14 using the graphics processor 54 to display a certain resolution on the display device 12, 14.

Figure 4:
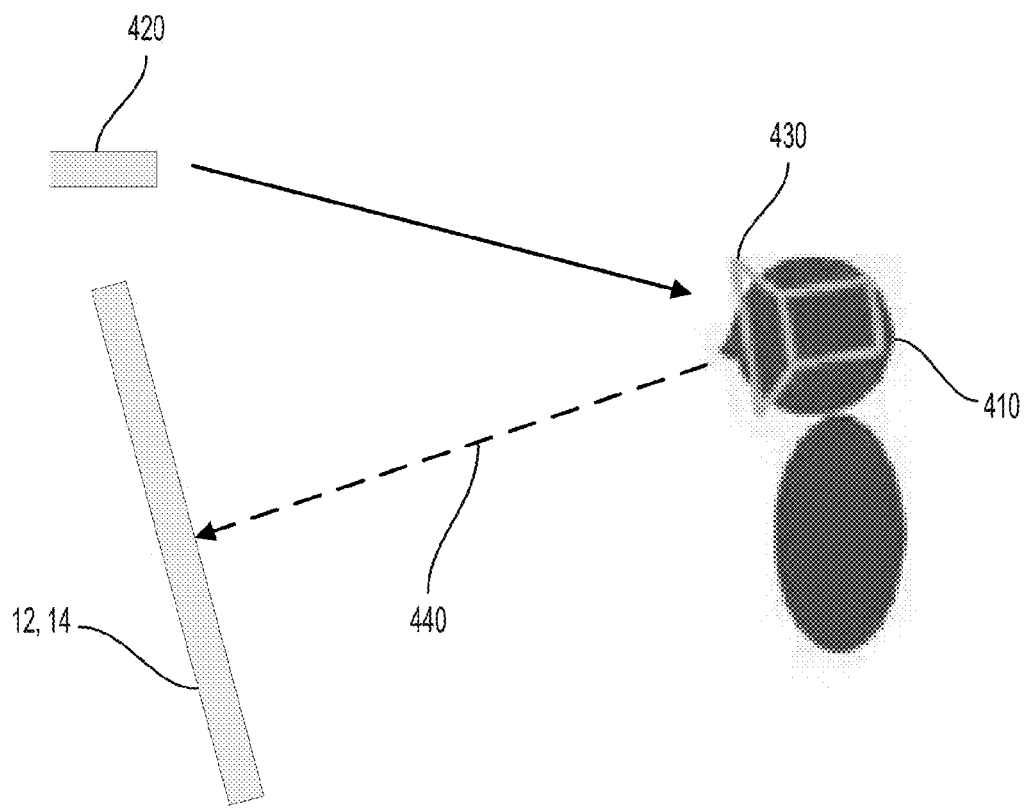
FIG. 4 is a schematic diagram illustrating the mapping of a player's eye gaze to the viewing area according to some embodiments.

In some embodiments, the game controller 44 may determine the location of the eye gaze relative to the viewing area based on the position of the player's eyes relative to the EGM 10 and an angle of the player's eyes. As shown in FIG. 4, the at least one data capture camera device 420 may monitor the position of the player's eyes 430 relative to EGM 10, and may also monitor the angle of the player's eyes 430 to collect display mapping data. The angle of the player's eyes may be determined based on the calibration of the at least one data capture camera device 420 described herein. The angle of the player's eyes may define the focus of the eye gaze, which may be a line of sight relative to the display device 12, 14. Based on the display mapping data, which may comprise the position of the player's eyes relative to the EGM 10 and an angle of the player's eyes or the line of sight relative, the game controller 44 may be configured to determine the direction and length of a virtual array 440 projecting from the player's eyes 430. Virtual array 440 may represent the eye gaze of the player 410. The game controller 44 may determine where the virtual array 440 intersects with the display device 12, 14. The intersection of virtual array 440 and display device 12, 14 may represent where the eye gaze of the player 410 is focused on the display device 12, 14. The display device 12, 14 may be controlled by display controller 52 to display the viewing area. The game controller 44 may identify coordinates on the display device 12, 14 corresponding to the player eye gaze data and may map the coordinates to the viewing area to determine the eye gaze of the player relative to the viewing area. EGM 10 may determine the location of the viewing area that the player 410 is looking at, which may be useful for EGM 10 to determine how the player 410 is interacting with the interactive game. In some embodiments, the eye gaze of the player may be expressed in 2D or 3D and may be mapped to a 2D or 3D viewing area, depending on whether the interactive game is a 2D interactive game or a 3D interactive game.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen).

Player input or control device 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. Display device 12, 14 may be a touch sensitive display device. Player control input device 50 may be integrated with display device 12, 14 to detect player interaction input at the display device 12, 14.

Game controller board 44 may also control one or more devices that produce the game output including audio and video output associated with a particular game that is presented to the user. For example, audio board 51 may convert coded signals into analog signals for driving speakers.

Game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 10, or may reside at host system 41. In some embodiments, the electronic data store storing game data may reside in the cloud.

Card reader 49 reads cards for player and credit information for cashless gaming. Card reader 49 may read a magnetic code on a conventional player tracking card, where the code uniquely identifies the player to a host system at the venue. The code is cross-referenced by host system 41 to any data related to the player, and such data may affect the games offered to the player by the gaming terminal. Card reader 49 may also include an optical reader and printer for reading and printing coded barcodes and other information on a paper ticket. A card may also include credentials that enable host system 41 to access one or more accounts associated with a user. The account may be debited based on wagers by a user and credited based on a win.

Graphics processor 54 may be configured to generate and render animation game enhancements based on game data as directed by game controller board 44. The game enhancements may involve an interactive game environment that may provide one or more game components and graphical animation effects. Graphics processor 54 may be a specialized electronic circuit designed for image processing (including 2D and 3D image processing in some examples) in order to manipulate and transform data stored in memory to accelerate the creation of images in a frame buffer for output to the display by way of display controller 52. Graphics processor 54 may redraw various game enhancements as they dynamically update. Graphics processor 54 may cooperate with game controller board 44 and display controller 52 to generate and render enhancements as described herein. Graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

Display controller 52 may require a high data transfer rate and may convert coded signals to pixel signals for the display. Display controller 52 and audio board 51 may be directly connected to parallel ports on the game controller board 44. The electronics on the various boards may be combined onto a single board. Display controller 52 may control output to one or more display device 12, 14 (e.g. an electronic touch sensitive display device). Display controller 52 may cooperate with graphics processor 54 to render animation enhancements on display device 12, 14.

Display controller 52 may be configured to interact with graphics processor 54 to control the display device 12, 14 to display a viewing area defining the interactive game environment including navigation to different views of the interactive game environment. Player control inputs 50 and the at least one data capture camera device may continuously detect player interaction commands to interact with interactive game environment. For example, the player may move a game component to a preferred position, select a game component, or manipulate the display of the game components.

In some embodiments, display controller 52 may control the display device 12, 14 using the graphics processor 54 to display the viewing area that may have one or more game components. In response to the detection of the control command based on the player eye gaze data, player eye gesture data, player movement data, or any combination thereof, display controller 52 may trigger a graphical animation effect to represent a visual update to the game components in the viewing area.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the at least one data capture camera device and updating the rendering of the viewing area, determines that the player eye gaze meets the filter movement threshold. The at least one data capture camera device may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where EGM 10 may be used may have a variety of lighting conditions. For example, EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the at least one data capture camera device may be an infrared data capture camera device. The infrared data capture camera device may collect player eye gaze data, player eye gesture data, and player movement data without being affected by the lighting conditions of the locations where EGM 10 may be used. In some embodiments, EGM 10 may have a plurality of light sources providing a plurality of spectra of light, and the at least one data capture camera device may be a plurality of data capture camera devices configured to detect a plurality of spectra of light, so the at least one data capture camera device may collect player eye gaze data, player eye gesture data, and player movement data without being affected by the lighting conditions of the locations where EGM 10 may be used.

A player that plays an interactive game using EGM 10 may be wearing glasses. The glasses of the player may cause refractions of the light that illuminates the player. This may affect the at least one data capture camera device while it monitors the eye gaze, eye gesture, and/or movement of the player. Glasses that comprise an infrared filter may also interfere with or affect the at least one data capture camera device while it monitors the eye gaze, eye gesture, and/or movement of the player. EGM 10 may recognize that the player may be wearing glasses. For example, as the interactive game commences, display controller 52 may display on display device 12, 14 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the at least one data capture camera device, that the light illuminating the player may be refracted, and may determine that the player is wearing glasses. When EGM 10 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 12, 14. The ability for game controller 44 to predict the location of the eye gaze of the player at a future time may be useful to rule out inaccurate readings. For example, while a player plays a game, the at least one data capture camera device may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 12, 14 where the player is not expected to be looking. This may be useful because the EGM 10 may have limited processing power. Not all visible game components may require high resolution. Only the game components that the player is looking at may require high resolution. The ability for game controller 44 to predict the location of the eye gaze of the player may allow display controller 52 to reduce the resolution of game components that the player may not be looking at, which may increase the efficiency of the processing power of the EGM 10.

In some embodiments, EGM 10 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 10 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 10 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 10 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 10, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

In some embodiments, the player may play an interactive game with EGM 10 in communication with a mobile device. Depending on the game data of the interactive game, the player may play the interactive game on EGM 10, on the mobile device, or on both. The player may play the interactive game using their eye gaze, eye gestures, movement, the interface of the mobile device, or any combination thereof. The player may play the interactive game using only the eye gaze of the player while the player holds on to the mobile device with one or more hands. The mobile device may, for example, be a computer, personal digital assistant, laptop, tablet, smart phone, media player, electronic reading device, data communication device, or a wearable device, such as Google™ Glass, virtual reality device, or any combination thereof. The mobile device may be a custom mobile device that may be in communication with EGM 10. The mobile device may be operable by a user and may be any portable, networked (wired or wireless) computing device including a processor and memory and suitable for facilitating communication between one or more computing applications of mobile device (e.g. a computing application installed on or running on the mobile device). A mobile device may be a two-way communication device with advanced data communication capabilities having the capability to communicate with other computer systems and devices. The mobile device may include the capability for data communications and may also include the capability for voice communications, in some example embodiments. The mobile device may have at least one data capture camera device to continuously monitor the eye gaze, eye gesture, or movement of the player and collect player eye gaze data, player eye gesture data, or player movement data.

EGM 10 may include a wireless transceiver that may communicate with the mobile device, for example using standard WiFi or Bluetooth, or other protocol based on the wireless communication capabilities of the mobile device. The player may be able to play the interactive game while the mobile device is in communication with EGM 10. When connected to the EGM 10, the viewing area may be displayed on display device 12, 14 or on the screen of the mobile device, or both. The at least one data capture camera device on the mobile device may collect player eye gaze data, player eye gesture data, or player movement data, which may be processed by a game controller 44 of EGM 10 to determine a location of the eye gaze of the player relative to the viewing area displayed on the mobile device. The game controller 44 may trigger a control command to the display controller 52 to dynamically update the rendering of the viewing area based on the player eye gaze data, player eye gesture data, or player movement data. In response to the control command from the game controller 44, the display controller 52 may control the display device 12, 14, the mobile device, or both, in real-time or near real-time using the graphics processor 54 to dynamically update the rendering of the viewing area to provide a real-time or near real-time graphical animation effect displayed on the display device 12, 14 or the mobile device representative of a visual update to the game components in the viewing area, the visual update based on the player eye gaze data, player eye gesture data, or player movement data.

In some embodiments, the mobile device in communication with EGM 10 may be configured to be a display device that compliments display device 12, 14 when playing the interactive game. The player may interact with the interactive game through the interface of the mobile device, through the EGM 10, or any combination thereof. The interactive game environment, viewing area, and game components of the interactive game may be displayed on the mobile device, display device 12, 14, or any combination thereof.

In some embodiments, a terminal may be connected to one or more EGM 10 over a network. The terminal may serve as a registration terminal for setting up the communication between the mobile device and any EGM 10 connected to the network. Therefore, the player does not have to physically go to EGM 10 to set up the link and play the interactive game associated with EGM 10.

Host system 41 may store account data for players. EGM 10 may communicate with host system 41 to update such account data, for example, based on wins and losses. In an embodiment, host system 41 stores the aforementioned game data, and EGM 10 may retrieve such game data from host system 41 during operation.

In some embodiments, the electronics on the various boards described herein may be combined onto a single board. Similarly, in some embodiments, the electronics on the various controllers and processors described herein may be integrated. For example, the processor of game controller board 44 and graphics processor 54 may be a single integrated chip.

EGM 10 may be configured to provide one or more player eye gaze, eye gesture, or movement interactions to one or more games playable at EGM 10. The enhancements may be to a primary interactive game, secondary interactive game, bonus interactive game, or combination thereof.

Figure 2B:
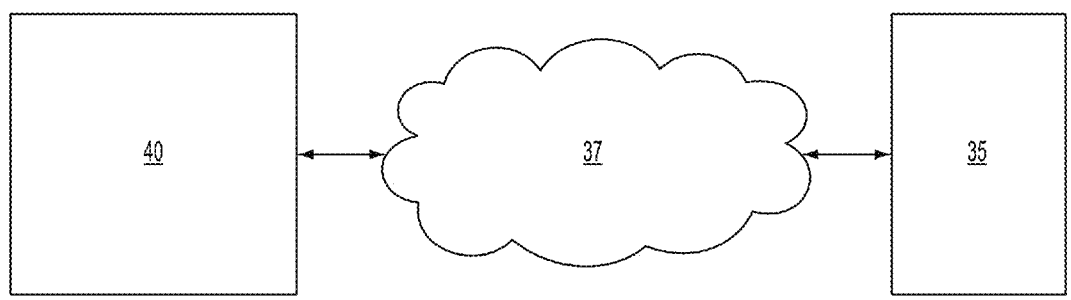
FIG. 2B is a schematic diagram of an exemplary online implementation of a computer system and online gaming system according to some embodiments.

FIG. 2B illustrates an online implementation of a gaming system that may continuously monitor the eye gaze of a player as described herein. The eye gaze of the player may be monitored and/or predicted such that data relating to tracked positions, trajectories, etc. may be obtained. Data may be processed to obtain further information, such as various derivatives of eye gaze data, including, for example, velocity, acceleration, snap, and jerk. The eye gaze data may be processed (e.g., smoothed out) to remove undesirable characteristics, such as artefacts, transient movements, vibrations, and inconsistencies caused by head movements, blinking, eye irregularities, eyelid obstruction, etc.

The gaming system may be an online gaming device (which may be an example implementation of an EGM). As depicted, the gaming system includes a gaming server 40 and a gaming device 35 connected via network 37.

In some embodiments, gaming server 40 and gaming device 35 cooperate to implement the functionality of EGM 10, described above. So, aspects and technical features of EGM 10 may be implemented in part at gaming device 35, and in part at gaming server 40.

Gaming server 40 may be configured to enable online gaming, and may include game data and game logic to implement the games and enhancements disclosed herein. For example, gaming server 40 may include a player input engine configured to process player input and respond according to game rules. Gaming server 40 may include a graphics engine configured to generate the interactive game environment as disclosed herein. In some embodiments, gaming server 40 may provide rendering instructions and graphics data to gaming device 35 so that graphics may be rendered at gaming device 35.

Gaming server 40 may also include a movement recognition engine that may be used to process and interpret collected player eye gaze data, player eye gesture data, and player movement data, to transform the data into data defining manipulations and player interaction commands.

Network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

Gaming device 35 may be particularly configured with hardware and software to interact with gaming server 40 via network 37 to implement gaming functionality and render 2D or 3D enhancements, as described herein. For simplicity, only one gaming device 35 is shown but an electronic gaming system may include one or more gaming devices 35 operable by different players. Gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features or EGM 10 may be implemented using gaming device 35.

Gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

Gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Gaming device 35 is operable to register and authenticate users (using a login, unique identifier, and password for example) prior to providing access to applications, a local network, network resources, other networks and network security devices. The computing device may serve one user or multiple users.

Gaming device 35 may include one or more input devices (e.g. player control inputs 50), such as a keyboard, mouse, camera, touch screen and a microphone, and may also include one or more output devices such as a display screen (with 3D capabilities) and a speaker. Gaming device 35 has a network interface in order to communicate with other components, to access and connect to network resources, to serve an application and other applications, and perform other computing applications.

Gaming device 35 connects to gaming server 40 by way of network 37 to access technical 2D and 3D enhancements to games as described herein. Multiple gaming devices 35 may connect to gaming server 40, each gaming device 35 operated by a respective player.

Gaming device 35 may be configured to connect to one or more other gaming devices through, for example, network 37. In some embodiments, the gaming server 40 may be utilized to coordinate the gaming devices 35. Where gaming devices 35 may be utilized to facilitate the playing of a same game, such as an interactive game, wherein the interactive game includes at interaction between activities performed by the players on the gaming devices 35, various elements of information may be communicated across network 37 and/or server 40. For example, the elements of information may include player eye gaze data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

Figure 5:
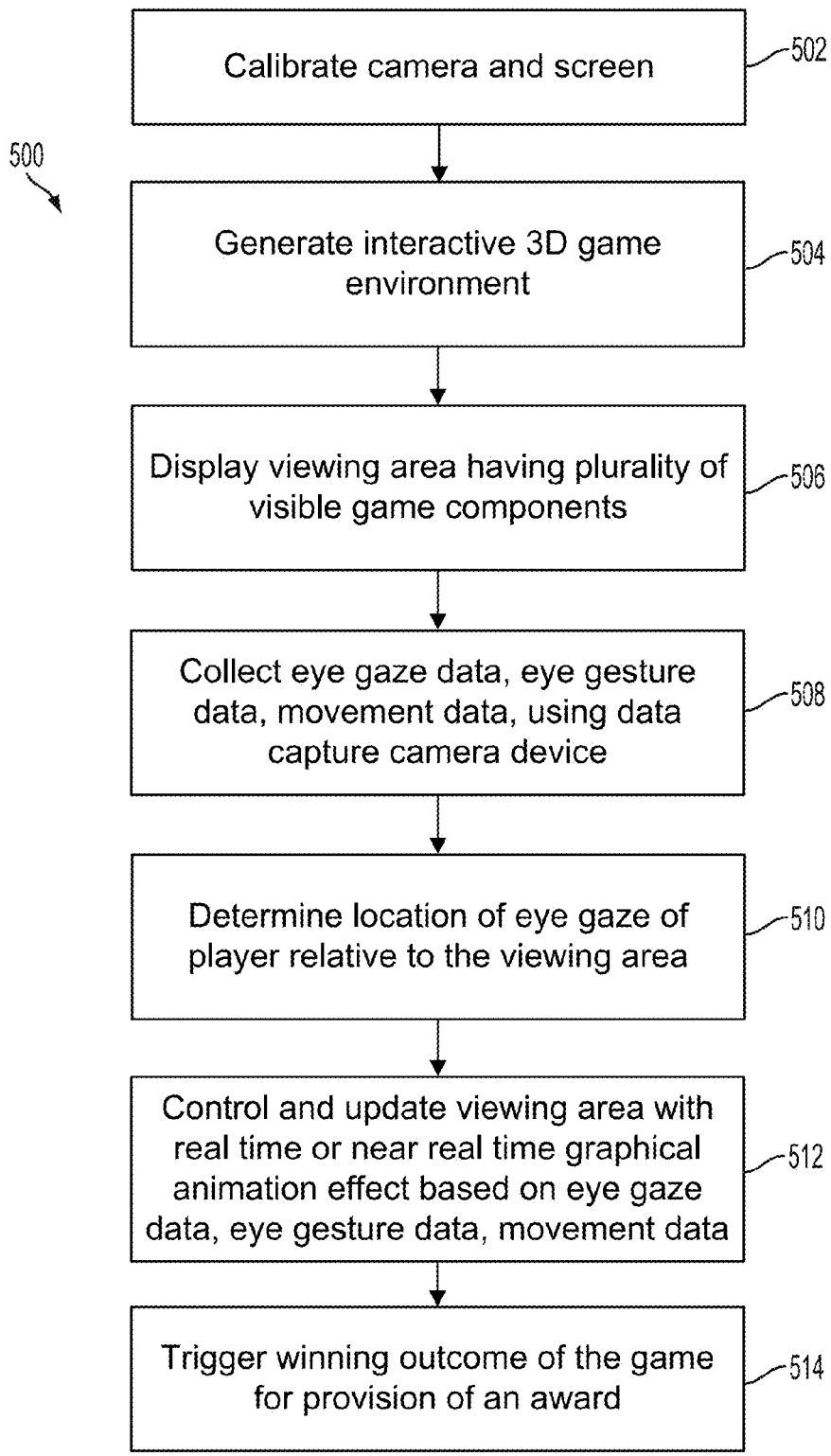
FIG. 5 is a flowchart diagram of a method implemented by an electronic gaming machine according to some embodiments.

FIG. 5 is a flowchart of a method 500 implemented by EGM 10 using various components of EGM 10. For simplicity of illustration, method 500 will be described with reference to FIG. 2A and EGM 10 but it may be implement using gaming device 35, game server 40 or a combination thereof.

As shown, EGM 10 may include a card reader 34 to identify a monetary amount conveyed by a player to the electronic gaming machine.

EGM 10 may include at least one data storage device storing game data for at least one interactive game or at least one bonus interactive game, or both.

EGM 10 may include graphics processor 54 to generate an interactive game environment and define a viewing area as a subset of the interactive game environment. The viewing area may have a plurality of game components based on the game data.

EGM 10 may include display device 12, 14 to display via a user interface the viewing area having the plurality of game components.

EGM 10 may include display controller 52 to control rendering of the viewing area on the display device 12, 14 using the graphics processor 54.

EGM 10 may include at least one data capture camera device to continuously monitor eye gaze of a player to collect player eye gaze data.

EGM 10 may include a game controller 44 for determining a location of the eye gaze of the player relative to the viewing area using the player eye gaze data and triggering a control command to the display controller 52 to dynamically update the rendering of the viewing area based on the player eye gaze data.

In response to detection of the control command, the display controller 52 controls the display device 12, 14 in real-time or near real-time using the graphics processor 54 to dynamically update the rendering of the viewing area to provide a real-time or near real-time graphical animation effect displayed on the display device 12, 14 representative of a visual update to the visible game components in the viewing area, the visual update based on the player eye gaze data.

In response to an outcome of the interactive game, the card reader 34 updates the monetary amount.

At 502 (FIG. 5), the at least one data capture camera device and the display device 12, 14 may be calibrated by game controller 44 and display controller 52 as described herein.

At 504 (FIG. 5), the graphics processor 54 may generate the interactive game environment in accordance with the set of game rules using the game data and define a viewing area as a subset of the interactive game environment. The viewing area may have a plurality of visible game components.

At 506 (FIG. 5), display controller 52 may control the display device 12, 14 may display via a user interface the viewing area having the plurality of visible game components.

At 508 (FIG. 5), the at least one data capture camera device may continuously monitor the eye gaze, eye gesture, and/or movement to collect player eye gaze data, player eye gesture data, and/or player movement data.

At 510 (FIG. 5), the game controller 44 may determine a location of the eye gaze of the player relative to the viewing area as described herein using the player eye gaze data, player eye gesture data, and/or player movement data and trigger a control command to the display controller 52 to dynamically update the rendering of the viewing area based on the player eye gaze data, player eye gesture data, and/or player movement data.

At 512 (FIG. 5), display controller 52 may, in response to detection of the control command, control the display device 12, 14 using the graphics processor 54 to dynamically update the rendering of the viewing area to provide a real-time or near real-time graphical animation effect displayed on the display device 12, 14 representative of a visual update to the visible game components in the viewing area. The visual update may be based on the player eye gaze data, player eye gesture data, and/or player movement data.

At 514 (FIG. 5), display controller 52 may trigger a winning outcome of the game for provision of an award based on the interactions of the player and the game, which may be associated with the player eye gaze data, the player eye gesture data, and/or the player movement data. The card reader 34 may update the monetary amount.

Figure 6:
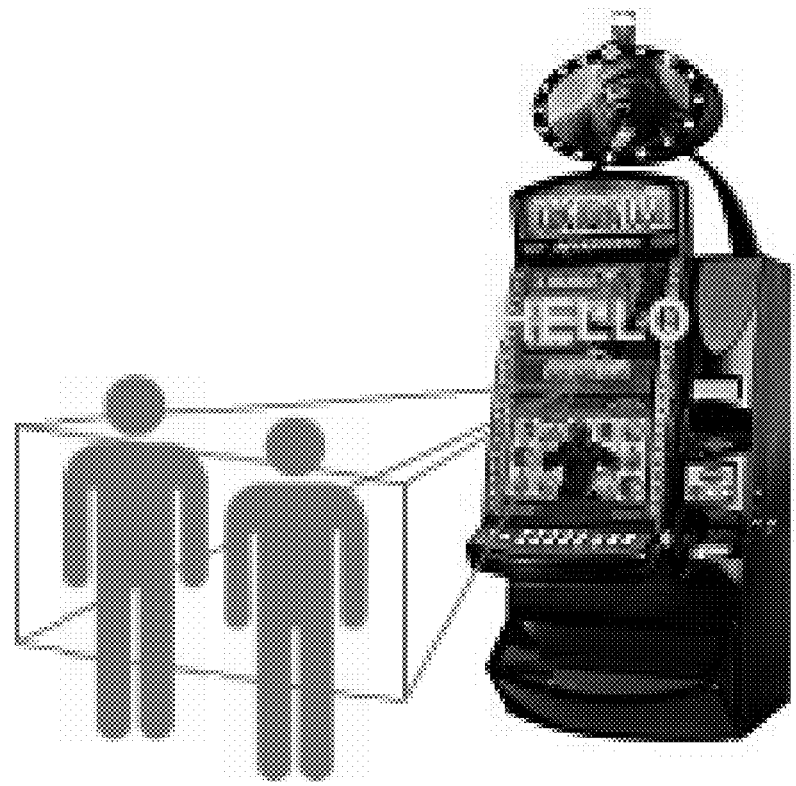
FIG. 6 is a schematic diagram illustrating an electronic gaming machine displaying an advertisement based on collected proximity data according to some embodiments.

In some embodiments, the EGM 10 may recognize potential players proximate to the EGM 10. As shown in FIG. 6, the at least one data capture camera device may continuously monitor an area proximate to the EGM 10 to collect proximity data. The game controller 44 may process the proximity data to detect if a person is proximate to the EGM 10. If a person is detected proximate to the EGM 10, then the display controller 52 controls the display device 12, 14 to display an advertisement. The ability for EGM 10 to recognize potential players proximate to the EGM 10 and commence active self-promotion is useful to gain a competitive advantage over other gaming machines. It may also be useful for welcoming and encouraging players to play the game and provide the player with a sense of astonishment. In contrast to a gaming machine that may interact with a player after the player has inserted a ticket, pressed a button, or touched a screen, EGM 10 actively starts the player's decision-making process to interact with EGM 10 sooner.

Figure 7A:
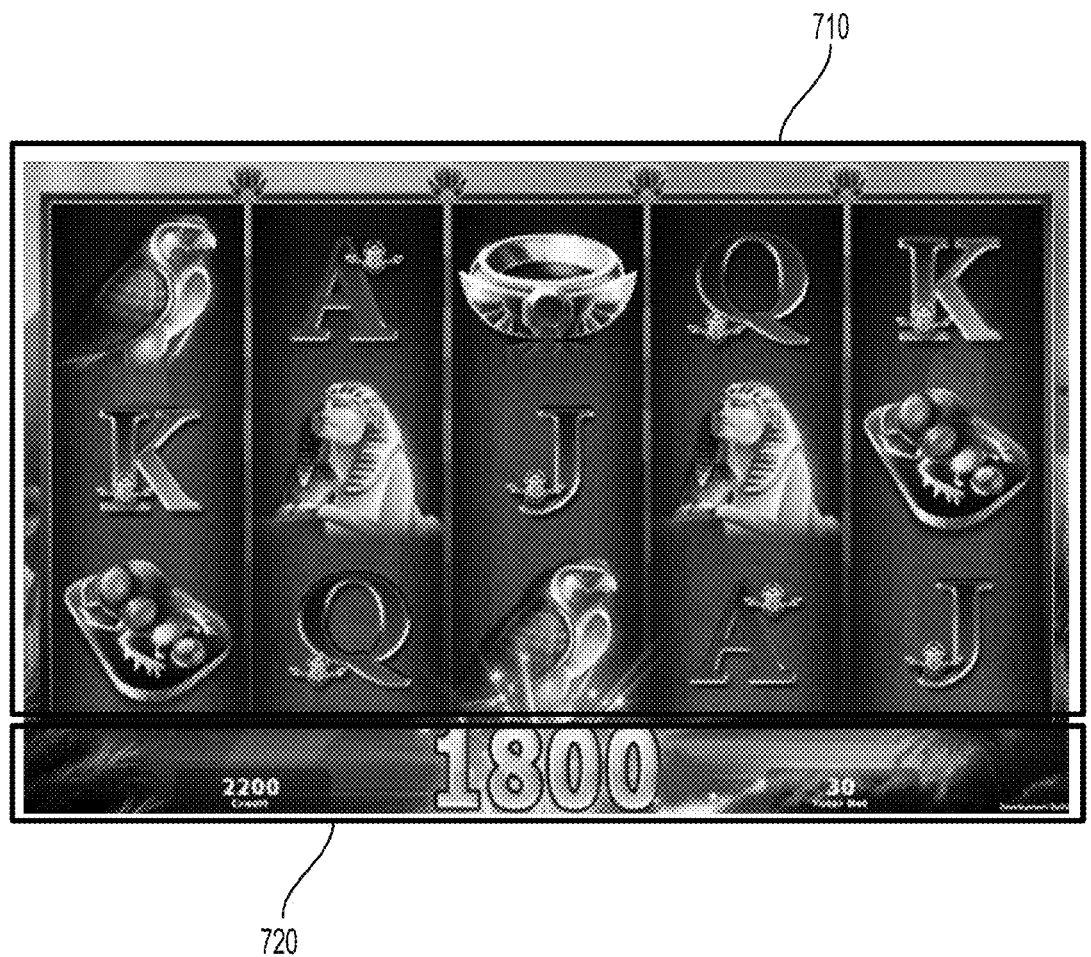
FIGS. 7A and 7B are schematic diagrams illustrating a gaze-sensitive user interface according to some embodiments.
Figure 7B:
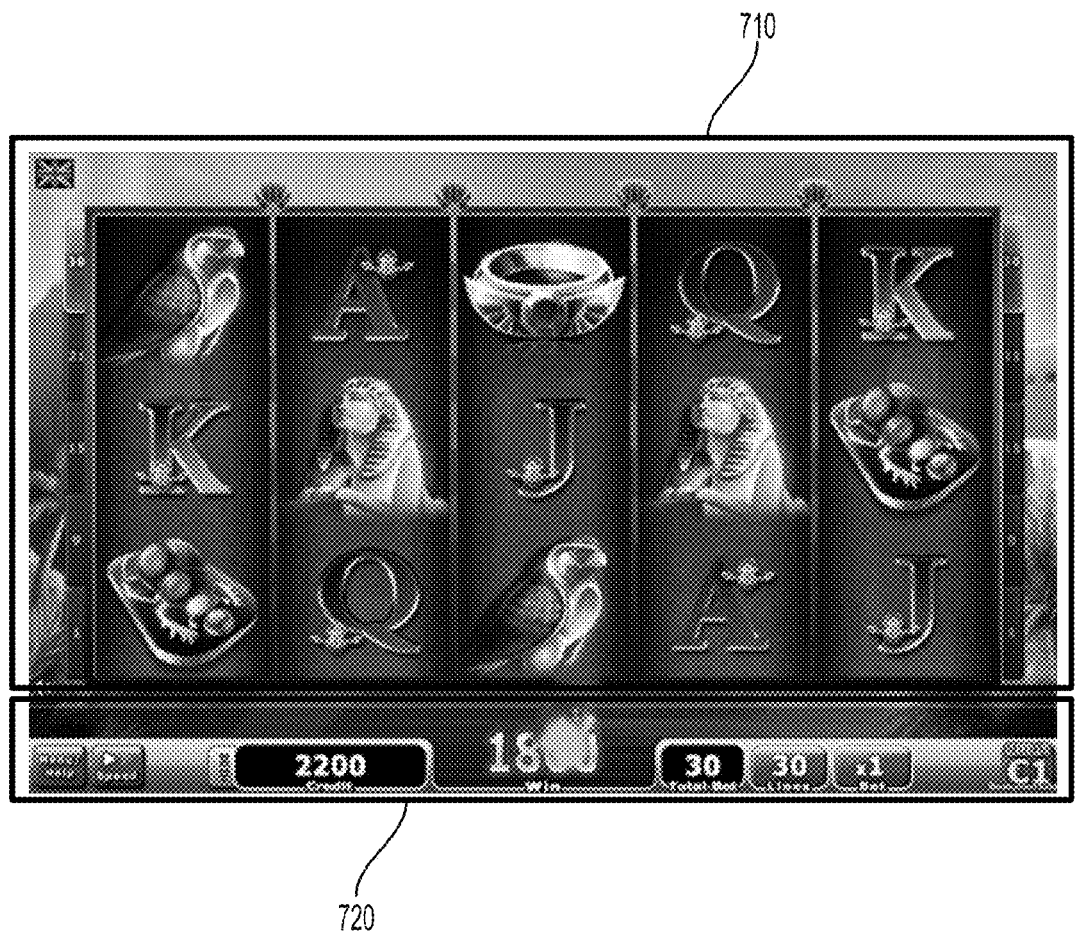

In some embodiments, the display controller 52 may render a gaze-sensitive user interface on the display device 12, 14, wherein the game controller 44 detects the location of the eye gaze of the player relative to the viewing area using the player eye gaze data, and triggers the control command to display controller 52 to dynamically update the rendering of the viewing area to provide a real-time or near real-time the graphical animation effect displayed on the display device 12, 14 representative of a visual update to the gaze-sensitive user interface. For example, display controller 52 may control display device 12, 14 to display a gaze-sensitive user interface as shown in FIG. 7A and FIG. 7B. The player may gaze at the one or more visible game components 710 at the top of the display device 12, 14, and the display controller 52 may cause a graphical animation effect to be displayed representative of reducing the size of or hiding an options menu 720 at the bottom of the display device 12, 14.

As shown in FIG. 7A, the options menu 720 may be small and out of the way. As the options menu 720 is being hidden, display controller 52 may cause another graphical animation effect to be displayed representative of enlarging the one or more visible game components 710 to use the portion of the display device 12, 14 vacated by the options menu 720. As another example, as illustrated in FIG. 7B, the player may gaze at the bottom of the display device 12, 14, which may cause the options menu 720 to be revealed and additional options may appear on screen. When the option menu 720 is revealed, the one or more visible game components 710 may reduce in size to accommodate the options menu 720. The player may gaze at a specific area of display device 12, 14, and additional information may be displayed on display device 12, 14. Even though the EGM 10 may have one or two display device 12, 14, a gaze-sensitive user interface may effectively increase the size of the display devices available to EGM 10. For example, as illustrated in FIGS. 7A and 7B, display device 12, 14 may display one or more visible game components 710 and an options menu 720 without requiring an increase in size of the display device 12, 14. The gaze-sensitive user interface may optimize the use of the limited space available on display device 12, 14. By monitoring the eye gaze of the player, EGM 10 may demonstrate context awareness of what the player is looking at. For example, the EGM 10 may detect when the player is distracted by detecting whether the eye gaze of the player is on the display device 12, 14.

EGM 10 may reward a player for maintaining their eye gaze on positive game aspects. For example, the at least one data capture display device may collect player eye gaze data that may indicate that the player is looking at a particular positive game component, such as, but not limited to, a positive game component representative of the rewarding of points, credits, prizes, or a winning line on a reel game. The display controller 52 may control the display device 12, 14 to display a graphical animation effect to enhance the positive game component with additional fanfare, for example, a special particle effect, fireworks, additional resolution and/or size of the positive game component, greater colour contrast and brightness, or lights and noises. In some embodiments, the graphical animation effect may correlate with the amount of time the player has maintained their eye gaze on the positive game component. The longer the player focuses their eye gaze on the positive game component, the more graphical animation effects may be displayed by display controller 52 on display device 12, 14 and/or the duration of the graphical animation effects may be extended.

Figure 8:
FIG. 8 is a schematic illustrating an electronic gaming machine with a stereoscopic 3D screen where the player can interact with objects displayed on the stereoscopic 3D screen with the player's eye gaze according to some embodiments.

The EGM 10 may include a display device 12, 14 with auto stereoscopic 3D functionality. As shown in FIG. 8, the player may interact with a game component presented on a display device 12, 14 with auto stereoscopic 3D functionality. The game component may appear to be hovering. The player may interact with the game component with the eye gaze of the player. For example, the focus of the eye gaze may cause the display controller 52 to control display device 12, 14 with auto stereoscopic 3D functionality to provide a graphical animation effect representative of rotating the game component. The EGM 10 that may have a display device 12, 14 with auto stereoscopic 3D functionality may allow a player to interact with the interactive game without their hands. This may be useful to not distract from or spoil the 3D effect provided by the display device 12, 14 with auto stereoscopic 3D functionality. Where the display device is a stereoscopic display device, the graphics processor 54 may generate left and right eye images based on a selected three-dimensional intensity level, and the game controller 44 may trigger the control command to the display controller 52 to dynamically update the rendering of the left and right eye images based on the player eye gaze data.

Tracking the eye gaze, eye gesture, and movement of a player may be implemented for a variety of interactive games and graphical animation effects. For example, the game may be a game with a reel space and game symbols. As another example, the game may be a game to focus eye gaze on a game component. The eye gaze of the player on display device 12, 14 may be implemented as a graphical animation effect to find and reveal a hidden or obscured game component. As yet another example, the game component manipulated by the player's eye gaze, eye gesture, and movement may be a virtual avatar. The virtual avatar may be navigated in the game using the player eye gaze data, player eye gesture data, player movement data, or any combination thereof, to avoid obstacles and collect rewards.

In some embodiments, the graphical animation effect displayed on the display device 12, 14 may change the focus of a game component. Other game components that may be closer or farther from the game component that the player is focusing on may be out of focus. Other game components on the same plane as the game component that the player is focusing on may be in focus.

In some embodiments, the graphical animation effect and visual update may focus on a portion of a visible game component and blur another portion of a visible game component. The game component that the player is focusing on may be rendered with higher detail, higher polygon count, and/or higher texture resolution. Other game components may be rendered at a lower detail as they are not being focused on by the player. This may increase the efficiency of the limited processing power of EGM 10.

In some embodiments, the graphical animation effect and the visual update magnifies a portion of the visible game components. For example, a visible game component or a portion of a visible game component displayed on display device 12, 14 may be rendered and updated to be magnified by display controller 52 and graphics processor 54 when the player's eye gaze focuses on the game component. The game controller 44 may process player eye gaze data collected by the at least one data capture camera device to determine when the player is focusing on a game component to be enlarged. This may be useful for a player with poor vision to have an engaging gaming experience while using EGM 10.

In some embodiments, the graphics processor 54 may generate an interactive game environment with a set of game rules using game data, such that there may be one or more invisible game components. The graphics processor 54 may define a viewing area as a subset of the interactive game environment, which may contain one or more invisible game components. The display controller 52 may control the display device 12, 14 in real-time or near real-time using the graphics processor 54 to update the rendering of the viewing area to provide a real-time or near real-time graphical animation effect representative of rendering visible at least a portion of the invisible game components in the viewing area. This may allow more game components to be displayed on the display device 12, 14, which may have finite size. For example, EGM 10 may provide a privacy mode for the player. There may be a menu at the bottom of display device 12, 14 that may display the credits conveyed to EGM 10 by the player or the amount of credits won by the player. The credits may be invisible or blurred out by default. When the player focuses their eye gaze on the user interface, the display controller 52 may control display device 12, 14 to reveal or display the amount of credits. The graphical animation effect to reveal or display the amount of credits may be, for example, to display the invisible credit amount, or to put in focus the blurred out credit amount. This may allow the player to hide the amount of credits associated with the player or the amount of credits won by the player from nearby observers.

As another example, the game data and game rules of an interactive game stored in the at least one data storage device may be such that the graphics processor 54 generates an interactive game environment and defines a viewing area displayed on display device 12, 14 by display controller 52 that may be representative of a dark or black screen. The graphical animation effect and visual update based on the player eye gaze data may be representative of a player shining a flashlight on the dark or black screen. The flash light graphical animation effect may follow the eye gaze of the player and provides light to the darkened screen. This may be used as part of a bonus game or bonus feature where the player may be required to find and highlight objects hidden in the dark to reveal prizes.

In some embodiments, the graphical animation effect and visual update may be representative of distorting a portion of the viewing area. The player eye gaze data may be processed by game controller 44 to determine the location of the eye gaze of the player relative to the viewing area. The display controller 52 may cause display device 12, 14 to display a distorted portion of the viewing area corresponding to the eye gaze of the player. This may be used to represent an effect of inebriation that may be part of the game play of the interactive game, depending on the game rules of the interactive game. As another example, the graphical animation effect and visual update may distort the portion of the viewing area corresponding to where the player is not looking. This may create a tunnel vision effect. The viewing area corresponding to the eye gaze of the player may be clear, but the viewing area where the player is not looking may be distorted.

In some embodiments, the graphical animation effect and visual update may be representative of distorting a portion of a 2D or 3D visible game component displayed on display device 12, 14. The visible game component may be displayed with warped geometry as the player focuses their eye gaze on the visible game component. The geometry of at least a portion of the visible game component may be pushed in or pulled out based on the player eye gaze data. The visible game component may be rendered on a quad that may be comprised of one or more smaller quads. When the player focuses their eye gaze on the visible game component, the portions of the visible game component closest to the player eye gaze may be displayed by display controller 52 on display device 12, 14 to be pushed in or pulled out to represent a warping of the visible game component.

In some embodiments, the graphical animation effect and visual update may be representative of hiding a portion of the visible game components. For example, during an interactive game, a flash may be triggered that may follow the eye gaze of the player. The flash may hide visible game components displayed on the display device 12, 14. This graphical animation effect and visual update may be used to simulate a flash bang, and a loud sound associated with the graphical animation effect may be triggered, based on the player eye gaze data. As another example, the graphical animation effect and visual update may represent the player throwing a flash bang grenade to the location of the viewing area corresponding to the eye gaze of the player, and a large flash may originate from the viewing area corresponding to the eye gaze of the player.

In some embodiments, the game controller 44 may process player eye gaze data to determine the location of the eye gaze of the player relative to the viewing area and may trigger a select command for the player to select a game component for a primary interactive game or a bonus interactive game. The player may focus their eye gaze at a visible game component for a certain period of time. After the certain period of time, the visible game component may break to reveal a prize hidden behind the visible game component.

In some embodiments, the visible game components displayed on display device 12, 14 may react with the eye gaze of the player. There may be one or more visible game components that display controller 52 may display on display device 12, 14 associated with the player winning an interactive game. For example, one or more coins may be rendered to fall from the top of the display device 12, 14 to the bottom. The coins may react based on the eye gaze of the player. The coins may be attracted to the location of the viewing area corresponding to the eye gaze of the player as determined by the game controller 44 and may collect at that location of the viewing area.

In some embodiments, the at least one data capture camera device of EGM 10 may continuously monitor an eye gesture of the player to collect player eye gesture data. Moreover, the at least one data capture camera device of EGM 10 may continuously monitor the player's movement, such as movement of the player's head, movement of the player's body, or gestures made by the player to collect player eye gaze data or player movement data. The game controller 44 triggers the control command to the display controller 52 to dynamically update the rendering of the viewing area based on the player eye gesture data and/or player movement data using the graphical animation effect to update the visible game components in the viewing area. For example, the at least one data capture camera device may collect player eye gesture data representative of the player squinting at a visible game component displayed on display device 12, 14. The game controller 44 may trigger a control command to display controller 52 to update the rendering the viewing area in real-time or in near real-time by displaying a graphical animation effect representative of magnifying the visible game component. As another example, the at least one data capture camera device may collect player movement data representative of the player moving their hand in a certain direction towards a visible game component displayed on display device 12, 14. The game controller 44 may trigger a control command to display controller 52 to update the rendering the viewing area in real-time or in near real-time by displaying a graphical animation effect representative of the player touching or interacting with the visible game component.

In some embodiments, the eye gaze of a player may interact with an interactive game that may include a 2D or 3D reel space. The at least one data storage device may store game data for an interactive game that may include a reel space. The graphics processor 54 may generate an interactive game environment, wherein the interactive game environment may provide a reel space of a matrix of plurality of game symbols. The display controller 52 may control display device 12, 14 to display a portion of the reel space. The display controller 52 may update the rendering of the display device 12, 14 to display a graphical animation effect representative of the reels spinning and stopping to present an alignment of game symbols, for example, during the game play. The pattern formed by the alignment of game symbols may trigger a particular outcome to the game, such as a win or a loss. When the reels are spinning in the game, the player may focus their eye gaze at a reel, which may cause the display controller 52 to control display device 12, 14 to display slower spinning of the reel to allow the player more time to see what game symbols are displayed on the display device 12, 14. When the reels have stopped spinning, the player may focus their eye gaze at the top or bottom of the reel and the reel may "nudge" by one or more spaces to affect the alignment of game symbols, which may affect the outcome of the game. The player may collect one or more "nudges" during the game play as a collective item and may use them after the reels have stopped spinning.

In some embodiments, the eye gaze of the player may be used in an interactive game that may include a reel space to trigger a bonus interactive game. For example, one or more game symbols in an interactive game may have a tile behind it. When a bonus is triggered, for example, based on an outcome of the game, a bonus object may be caused by display controller 52 to be displayed on display device 12, 14. The player may focus their eye gaze on the bonus object and the tile behind a game symbol may break. The bonus interactive game may be triggered and rendered on display device 12, 14 after each tile behind a game symbols breaks. As another example, when a pre-determined alignment of game symbols occurs, each tile behind the aligned game symbols may crack. The player may focus their eye gaze on a cracked tile to break the tile. Once all the tiles are broken, the bonus interactive game may be triggered and rendered on display device 12, 14.

In some embodiments, the player may focus their eye gaze on a game component to trigger one or more outcomes, effects, features, and/or bonus games. This may cause the player to pay more attention to the game, and may increase the enjoyment and interactivity experienced by the player. The at least one data storage device of EGM 10 may store game data for at least one interactive game and at least one bonus game. The game controller 44 may trigger the display controller 52 to transition from the at least one interactive game to the at least one bonus game based on the player eye gaze data using the graphical animation effect. The eye gaze of the player may trigger effects associated with the interactive game and/or commence the bonus game. For example, a bonus object such as a peephole may be displayed on display device 12, 14. The player may focus their eye gaze on the peephole for a pre-determined amount of time. Based on the player eye gaze data, the game controller 44 may determine that the player has focused their eye gaze on the peephole for the pre-determined amount of time, and may trigger the bonus game. The display controller 52 may control display device 12, 14 to display a graphical animation effect representative of zooming into the peephole and reveal the bonus screen. This may increase the attention paid to EGM 10 by the player and the amount of enjoyment experienced by the player when interacting with EGM 10.

Figure 9A:
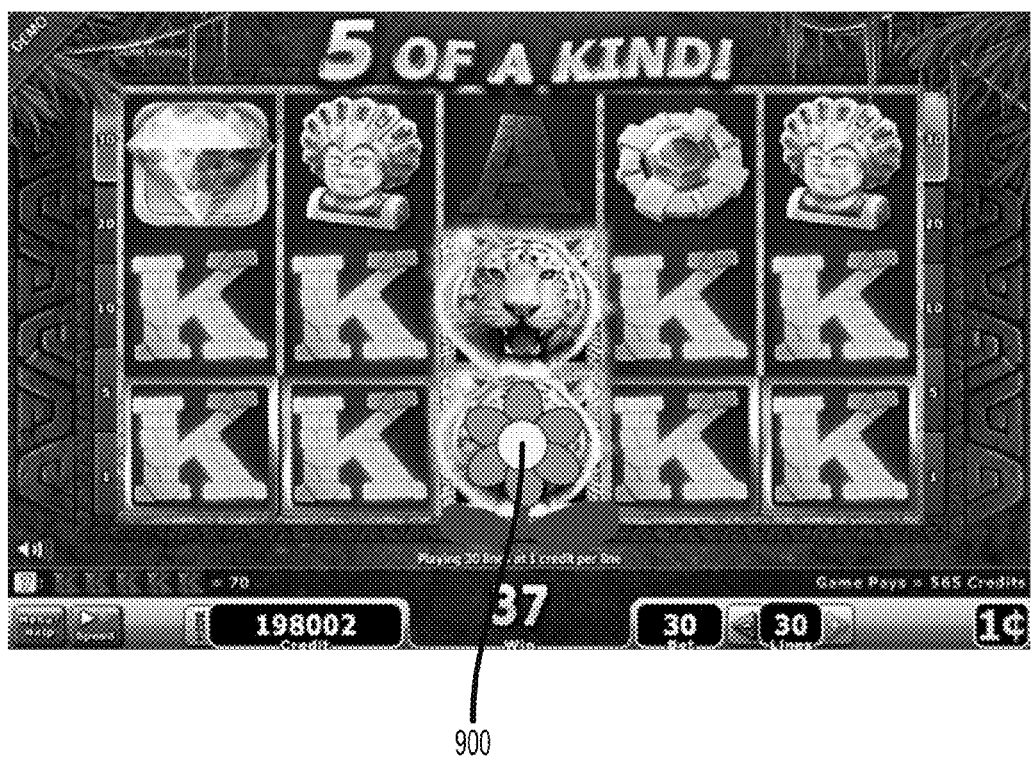
FIGS. 9 to 12E are schematic diagrams illustrating some embodiments of interactions between a player's eye gaze and the viewing area.
Figure 9B:
Figure 9C:

The eye gaze of the player may affect the game play of the interactive game, such as triggering and transitioning from a primary interactive game to a bonus interactive game. The player may focus on a bonus object 900 displayed on display device 12, 14 for display controller 52 to control display device 12, 14 to render and display the bonus screen of a bonus game. For example, as shown in FIG. 9A, display controller 52 may control display device 12, 14 using graphics processor 54 to display a flower, which may be the bonus object 900. The game controller 44 may determine, based on the collected player eye gaze data, that the player is focusing their eye gaze on the flower. The game controller 44 may trigger a control command to display controller 52, and in response, the display controller 52 may display on display device 12, 14 using graphics processor 54 a graphical animation effect related to the bonus object 900. For example, as shown in FIG. 9B, the graphical animation effect may represent the flower growing as the player's eye gaze is maintained on the flower. When the flower has grown to a certain point, the game controller 44 may trigger a control command to the display controller 52 to transition from the primary interactive game to the bonus interactive game based on the player eye gaze data using a graphical animation effect, as shown in FIG. 9C. The graphical animation effect may be a message stating that the bonus has been triggered.

Figure 10:
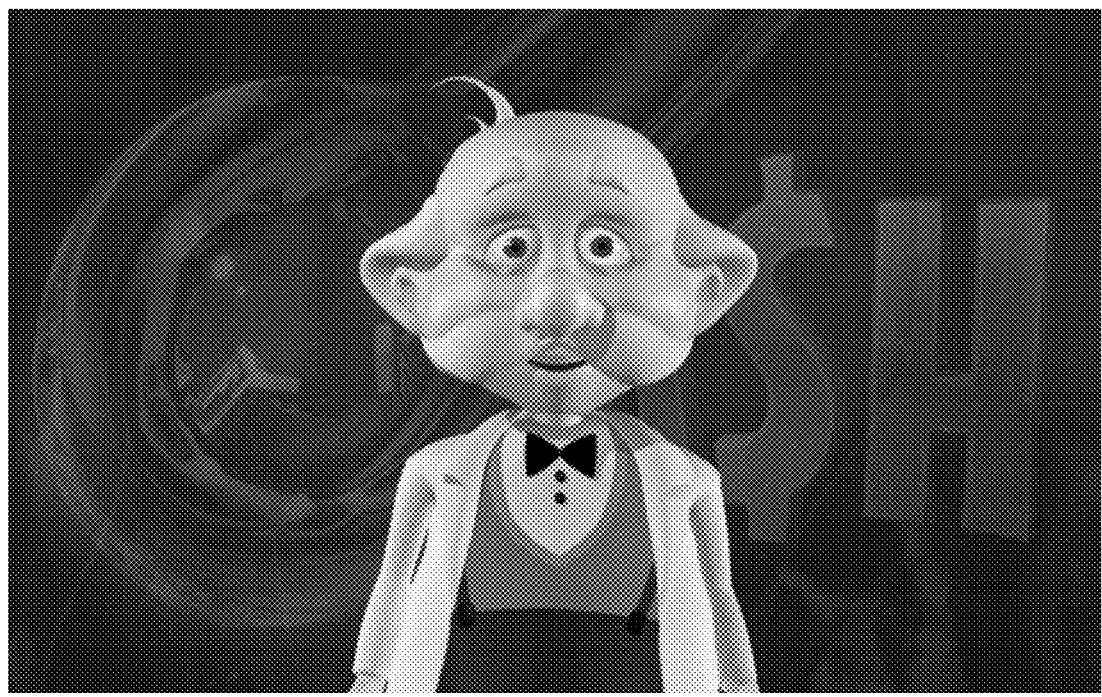

The player may have to stare at a location of the display device 12, 14 without blinking to trigger the bonus game. The at least one data capture camera device may continuously monitor the eyes of the player to collect player eye gaze data and player eye gesture data. The game controller 44 may process the player eye gaze data and player eye gesture data to determine if the player has stared at a pre-determined location of the viewing area without blinking by mapping the location of the eye gaze on the display device 12, 14 to the viewing area. After the player has stared at the pre-determined location of the viewing area for enough time without blinking, the game controller 44 may communicate a command to display controller 52 to display the bonus game on display device 12, 14. For example, as shown in FIG. 10, an avatar may be displayed on display device 12, 14. The avatar may relate to the interactive game, the bonus game, branding associated with EGM 10, and/or the venue where the EGM 10 may be located. The avatar may be named, based on its relationship with the interactive game, the bonus game, branding associated with EGM 10, and/or the venue where the EGM 10, such as "Mr. Cash Fever". The bonus game may be triggered after the player plays a staring game with the avatar. The avatar may be pre-configured by game controller 44 to blink after a certain amount of time. Game controller 44 may determine, based on the collected player eye gaze data and player eye gesture data, if a player is staring at the location of the viewing area corresponding to the eyes of the avatar, and if a player has blinked. Game controller 44 may determine if the avatar blinked first or if the player blinked first. If the game controller 44 determines that the avatar blinked first, then it may trigger a control command to display controller 52 to display a graphical animation effect on display device 12, 14 using graphics processor 54 representative of transitioning from the primary interactive game to the bonus interactive game.

Figure 11A:
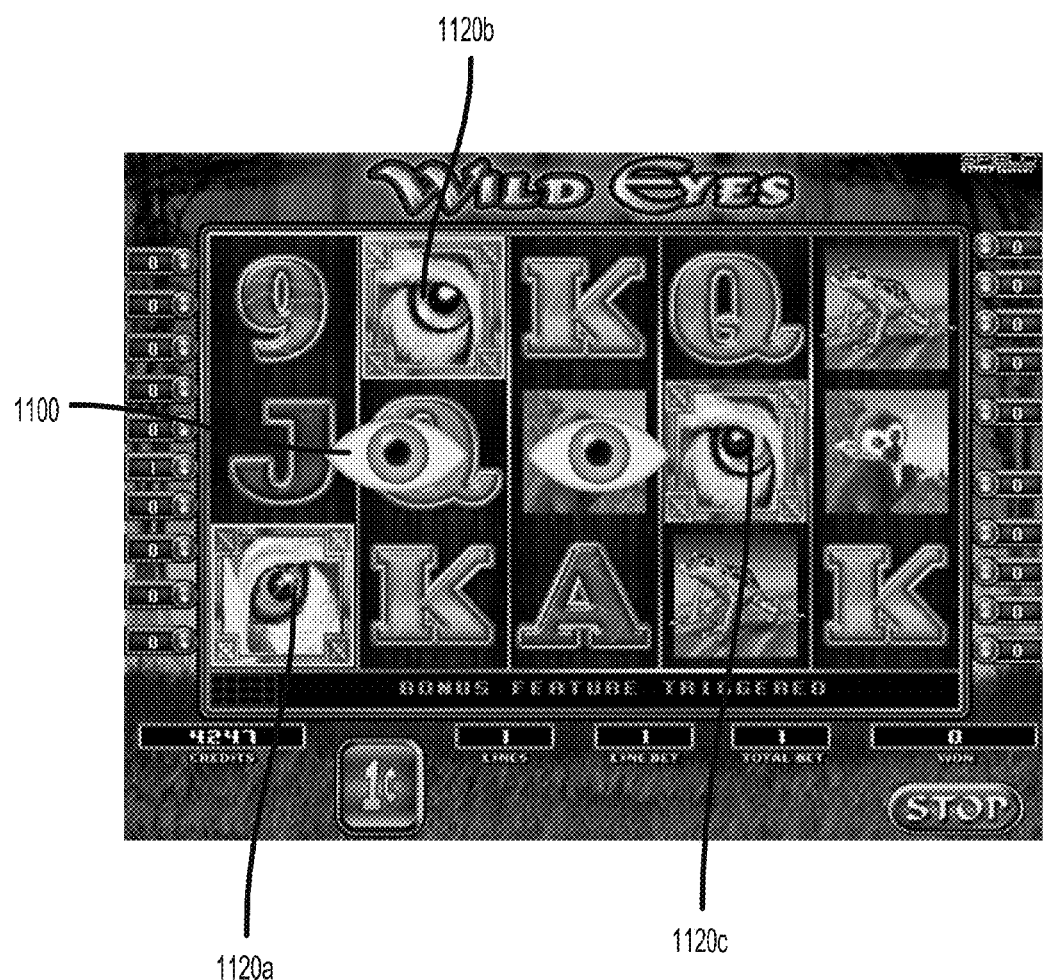

In some embodiments, display controller 52 may control display device 12, 14 using graphics processor 54 to display one or more visible game components and/or one or more graphical animation effects representative of the one or more visible game components interacting in response to the eye movement, eye gesture, and/or movement of the player. This may be implemented as part of a trigger of a bonus interactive game or a prize. For example, as shown in FIGS. 11A to 11O, one or more eyes 1120a, 1120b, and 1120c, may be displayed on display device 12, 14. The eyes 1120a, 1120b, and 1120c may be the eyes of a visible game component that may be a bonus visible game component. Game controller 44, based on the player eye gaze data collected by the at least one data capture camera device, may determine the location of the player's eyes in 3D space relative to EGM 10 and the focus of the player's gaze 1100 on display device 12, 14.

Figure 11B:
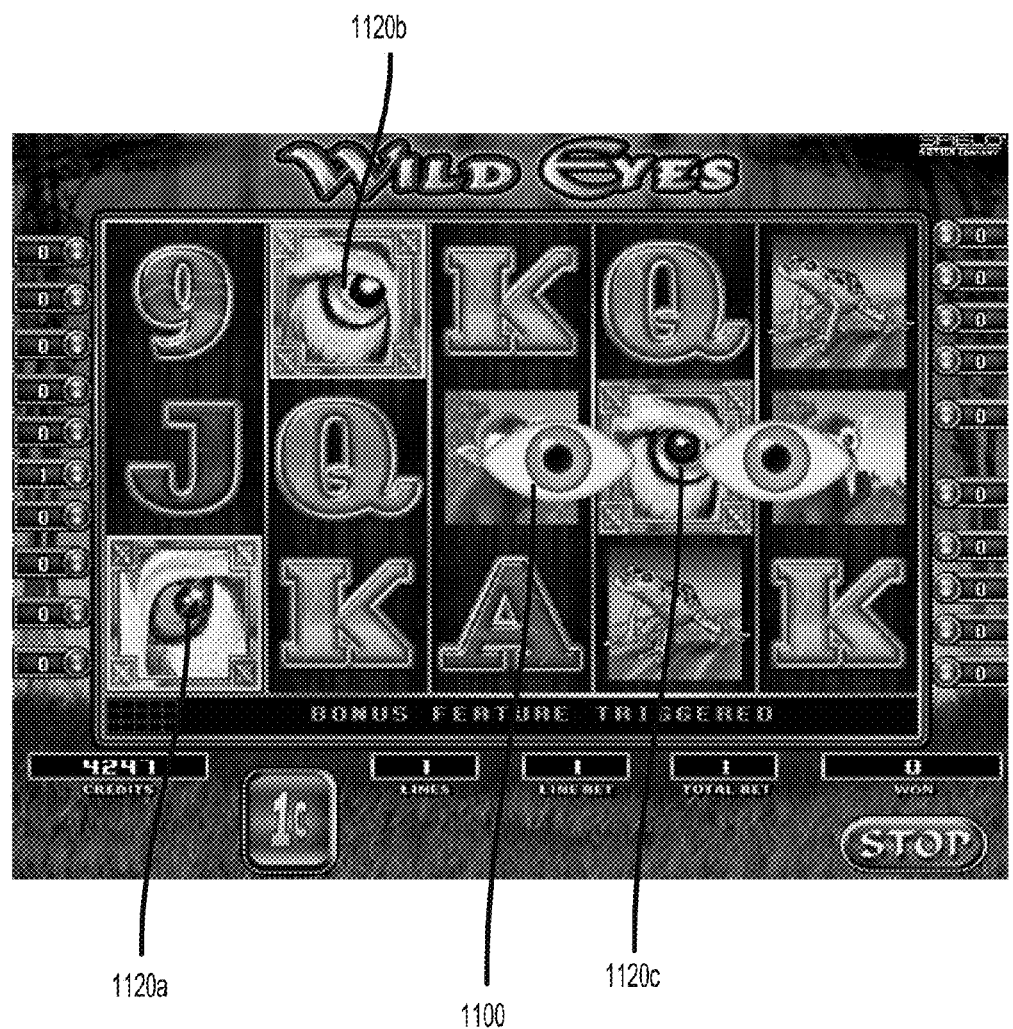
Figure 11C:
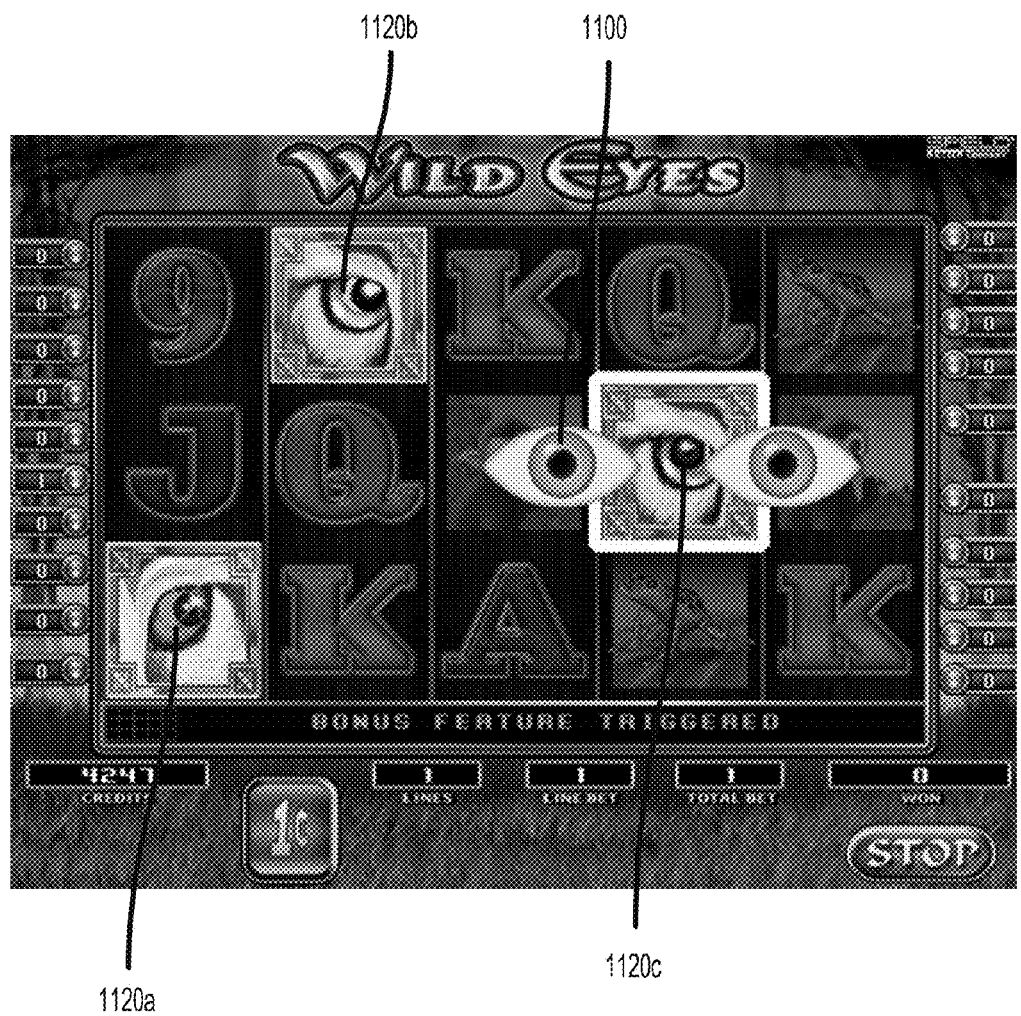

The graphical animation effect displayed on display device 12, 14 by display controller 52 may be for the eyes 1120a, 1120b, and 1120c on display device 12, 14 to track the player and/or the player's eye gaze 1100. If the player and/or player eye gaze 1100 moves in a certain direction, such as to the right, as shown in FIG. 11B compared to FIG. 11A, the eyes 1120a, 1120b, 1120c, displayed on the display device 12, 14 may follow the player in the same direction. As another example, there may be more than one set of eyes displayed on display device 12, 14. Each eye 1120a, 1120b, 1120c may track and follow the player and/or player eye gaze 1100. The player may focus their eye gaze 1100 on one of the eyes. As shown in FIG. 11C, the eye gaze 1100 of the player is focused on eye 1120c. The other eyes 1120a and 1120b may continue to track the player.

The game controller 44 may determine that the player is looking at one of the eyes, and may trigger a control command to display controller 52 to display on display device 12, 14 a graphical animation effect. The graphical animation effect may be representative of transitioning to a bonus interactive game, or representative of triggering a prize for the game, like a bonus multiplier, or a combination thereof. In some embodiments, a bonus multiplier game component may be revealed by the graphical animation effect and game controller 44 may apply a bonus multiplier corresponding to the bonus multiplier game component in the bonus interactive game. As yet another example, one or more eyes displayed on display device 12, 14 may be the eyes of a visible game component, such an avatar displayed on display device 12, 14, such as an animal or a person.

The player may have to focus their eye gaze on a location of the viewing area to trigger the bonus game. The location of the viewing area that the player has to focus on to trigger the bonus game may change gradually or suddenly, depending on the game rules. For example, as shown in FIGS. 12A to 12E, a bonus game trigger may require the player to cause a game component representative of a bundle of dynamite displayed on display device 12, 14 by display controller 52 to explode to trigger the bonus game.

Figure 12A:
Figure 12B:
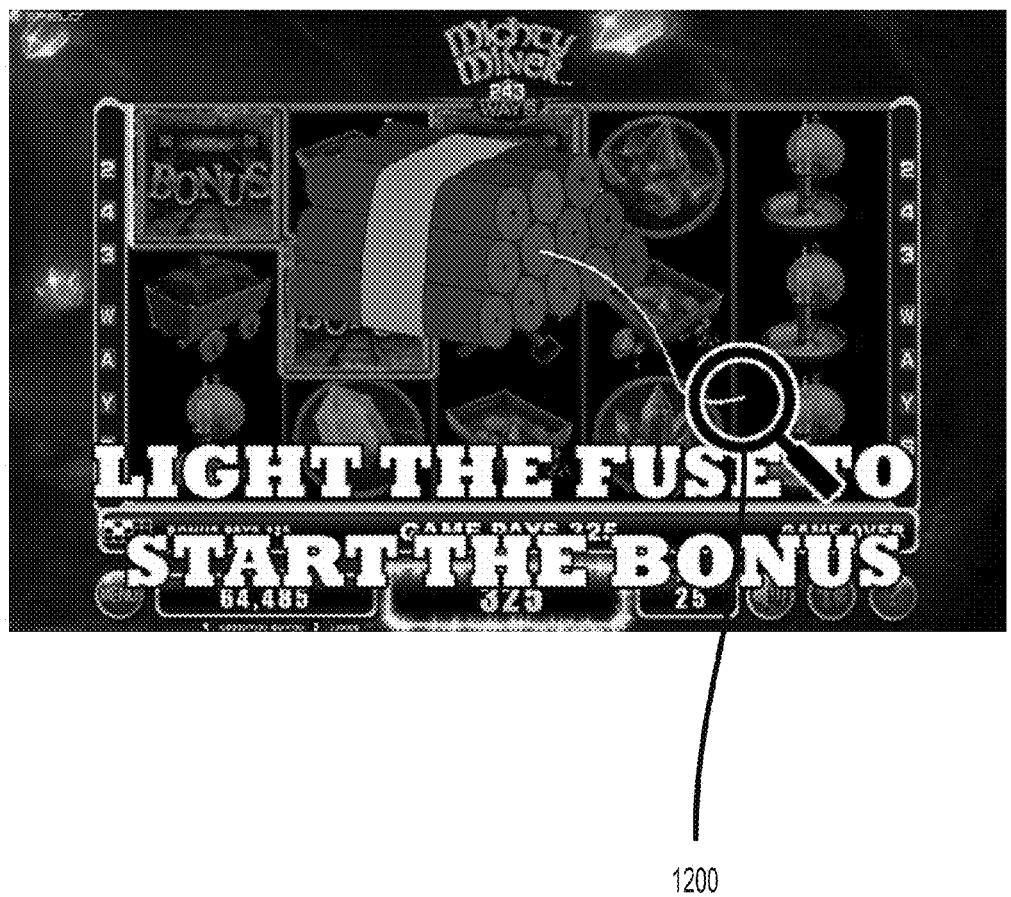

As shown in FIG. 12A, a bonus game trigger event may occur. As shown in FIG. 12B, display controller 52 may control display device 12, 14 to display a game component representative of a stick or a bundle of sticks of dynamite. Display controller 52 may display on display device 12, 14 a prompt for the player to light the fuse. The game controller 44 may determine that, based on the player eye gaze data, that the player may be focusing their eye gaze 1200 on the viewing area corresponding to the location of the fuse. The game controller 44 may trigger a control command to display controller 52 to display a graphical animation effect representative of igniting the fuse. In some embodiments, a magnifying glass game component may be displayed on display device 12, 14 by display controller 52 to represent the eye gaze 1200 of the player. A visible game component representative of the sun or a light source may be displayed on display device 12, 14 by display controller 52 to act as the source of light for the displayed magnifying glass game component, which may convey to the player that the player's eye gaze 1200 is representative of a magnifying glass that focuses the light from the light source to spark the fuse.

Figure 12C:
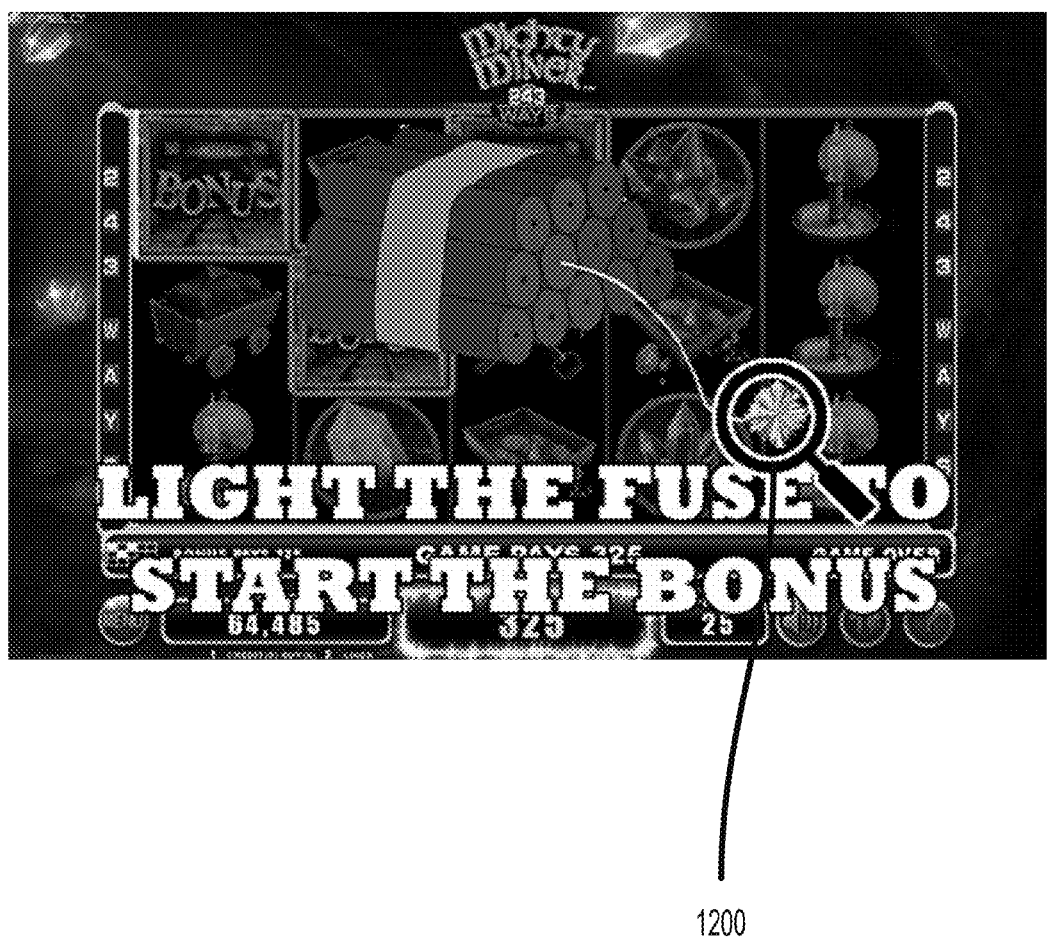

As shown in FIG. 12C, the player may maintain their eye gaze 1200 on the fuse for a specified amount of time. The at least one data capture camera device may monitor the player's eye gaze 1200 and collect player eye gaze data. The game controller 44 may determine that the player is focusing their eye gaze on the viewing area corresponding to the location of the fuse. Game controller 44 may trigger the control command to display controller 52 to display a graphical animation effect on display device 12, 14 representative of lighting the fuse.

Figure 12D:
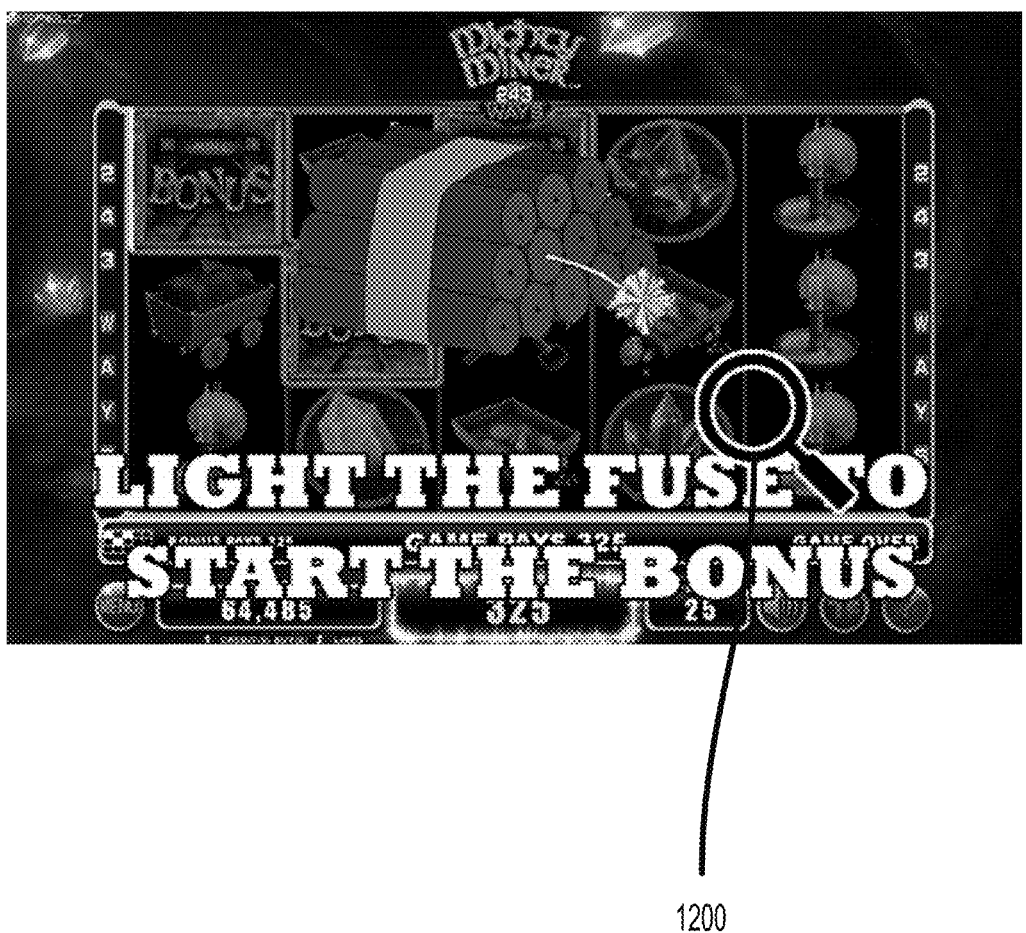

As shown in FIG. 12D, a graphical animation effect may be displayed on display device 12, 14 by display controller 52 representative of the fuse burning up. In some embodiments, the player may have to follow the moving spark along the fuse until the fuse has reached the bundle of dynamite. The at least one data capture camera device may collect player eye gaze data, and game controller 44 may determine that the player's eye gaze is following the moving spark. The game controller 44 may collect the player eye gaze data to determine if the player has lit the fuse and/or followed the spark along the fuse, and may send a control command for display controller 52 to display a graphical animation effect to transition to the bonus game and render the bonus screen on display device 12, 14.

Figure 12E:
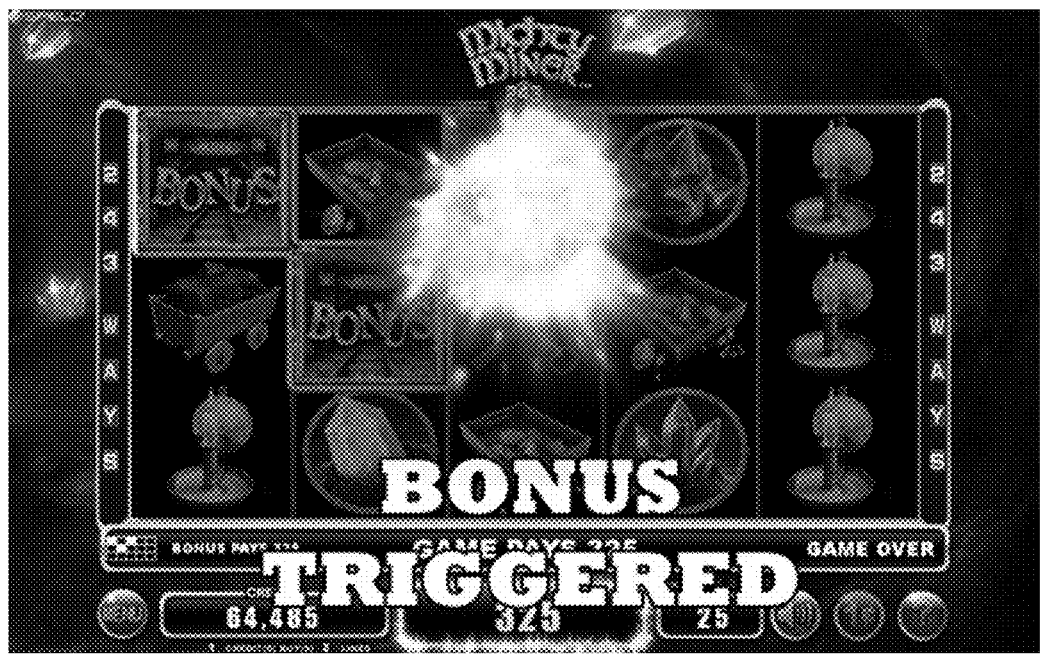

For example, as shown in FIG. 12E, once the graphical animation effect representative of the spark has reached the visible game component representative of the stick or bundle of sticks of dynamite, the graphical animation effect displayed on display device 12, 14 may represent an explosion of the dynamite, the bonus may be triggered, and there may be a transition from the primary interactive game to the bonus interactive game.

In some embodiments, the player may interact with the bonus game using the eye gaze of the player. The at least one data storage device may store game data for at least one bonus game. The game controller 44 may trigger the control command to the display controller 52 to dynamically update the rendering of the viewing area to provide a real-time or near real-time graphical animation effect displayed on the display device 12, 14 representative of a visual update to the visible game components of the bonus game in the viewing area, the visual update based on the player eye gaze data.

For example, the bonus game may be a whack-a-mole bonus game, which may have visible game components appear and disappear on display device 12, 14. When a player focus their eye gaze at one or more visible game components, the display controller 52 may control the display device 12, 14 to display a graphical animation effect representative of collecting the visible game components. The visible game components may be collected for a prize. After a pre-determined amount of visible game components have been collected, the bonus game may be finished.

As another example, the bonus game may require the player close one eye to trigger breaking of visible game components that the player is looking at with their open eye. The at least one data capture camera device may collect player eye gaze data and the player eye gesture data. The game controller 44 may process the player eye gaze data and the player eye gesture data to determine that a player is looking at a certain visible game component with one eye, and may send a command to display controller 52 to cause display device 12, 14 to display a graphical animation effect representative of breaking the visible game component when the player blinks with the other eye. For the player, the blink of the eye may represent an action such as pulling a trigger on a gun.

As yet another example, the bonus game may require the player to act as a wizard. The player may interact with the bonus game with the eye gaze of the player, the movement of the player, or both. The at least one data capture camera device may continuously monitor the eye gaze of the player and the movement of the player to collect player eye gaze data and player movement data. Based on the player eye gaze data and the player eye gesture data, the game controller 44 may trigger a control command to the display controller 52 to display a graphical animation effect on display device 12, 14 representative of the player casting spells to interact with visible game components and to uncover prizes.

In some embodiments, the interactive game may require skill from the player to complete. For example, the interactive game may require a player to complete a task within a finite amount of time. The amount of time remaining for the player to complete the task may be displayed on display device 12, 14 to increase pressure on the player. For example, the interactive game may be a skill-based maze bonus game. The player may control an avatar using the player's eye gaze to travel through a series of mazes. The player may cause the avatar to collect prizes. There may be a timer to indicate the amount of time the player may navigate the maze. The maze may include traps that may be visible or invisible. The player may look at the traps with their gaze to deactivate the traps and allow the avatar to continue through the maze. Once the player has guided the avatar to the exit, the player may play a new stage of the maze based upon the amount of prizes collect, or the maze game may finish. The threshold for the amount of prizes needed to be collected may progressively increase based upon which bonus stage the player is at. The maze bonus game may be configured to have one or more levels of difficulty. The higher the difficulty, the less time the player may have to complete the maze challenge and the player may have to navigate through more traps in the maze.

In some embodiments, for another skill-based maze game, while the player leads an avatar through a maze using the eye gaze of the player, there may be special tiles that the display controller 52 may be configured to cause to appear on the display device 12, 14. The player may have a specified number of breakable tiles actions. While moving the avatar through the maze, the player may break any wall by locking their gaze on the wall. This may be used to help the player to find the exit.

A player may play one or more games at EGM 10. The player may have the option of selecting an interactive game from a plurality of interactive games to be played at EGM 10 when the player initially conveys credits to EGM 10. However, not all game selector symbols may be displayed on display device 12, 14 because the display device 12, 14 may lack space. EGM 10 of the present invention may overcome the lack of space on the display device 12, 14. The player may use their eye gaze to display a plurality of game selector symbols and to select and play a game from the plurality of games. In some embodiments, EGM 10 may have a card reader to identify the monetary amount conveyed by the player to the EGM 10. The EGM 10 may have at least one data storage device that may store game data for a plurality of interactive games. The graphics processor 54 may generate an interactive game environment in accordance with a set of game rules using the game data and define a viewing area as a subset of the interactive game environment, the viewing area having one or more game selector symbols. EGM 10 may have display device 12, 14 to display via a user interface the viewing area having the one or more game selector symbols. EGM 10 may have a display controller 52 to control rendering of the viewing area on the display device 12, 14 using the graphics processor 54. At least one data capture camera device may continuously monitor the eye gaze of a player to collect player eye gaze data. A game controller 44 may determine a location of the eye gaze of the player relative to the viewing area using the player eye gaze data and triggering a control command to the display controller 52 to dynamically update the rendering of the viewing area based on the player eye gaze data. In response to the control command, the display controller 52 may control the display device 12, 14 in real-time or near real-time using the graphics processor 54 to dynamically update the rendering of the viewing area to provide a real-time or near real-time graphical animation effect displayed on the display device 12, 14 representative of a visual update corresponding to selecting one of the game selector symbols in the viewing area and displaying a selected interactive game for the selected game selector symbol, the visual update based on the player eye gaze data. For example, display controller 52 may control display device 12, 14 to display a plurality of game selector symbols configured in the shape of a carousel. Based on the eye gaze of the player, such as up, down, left, or right, the display controller 52 may control display device 12, 14 to display a rotating carousel of game selector symbols, which may reveal additional and hidden game selector symbols. Based on the eye gaze of the player, such as looking at or near the center of display device 12, 14, the rotating carousel of game selector symbols may slow down or stop at a game selector symbol corresponding to the player's preferred game. In response to an outcome of the interactive game, the card reader may update the monetary amount. The player may focus on the game selector symbol to select and play the game. In some embodiments, the player may scroll through the plurality of game selector symbols using their eye gaze, eye gestures, the movement of their head, the movement of their body, or a combination thereof.

A player may use their eye gaze to navigate through the interactive game environment, change the camera angle on a visible game component, and reveal objects in the interactive game environment that may not be in the viewing area. The EGM 10 may have a card reader to identify a monetary amount conveyed by a player to the EGM 10. The EGM 10 may have at least one data storage device to store game data for an interactive game. The graphics processor 54 may generate an interactive game environment in accordance with a set of game rules using the game data and define a viewing area as a first portion of the interactive game environment. The display device 12, 14 may display via a user interface the viewing area. Display controller 52 may control rendering of the viewing area on the display device 12, 14 using the graphics processor 54. At least one data capture camera device may continuously monitor eye gaze of a player to collect player eye gaze data. The game controller 44 may determine a location of the eye gaze of the player relative to the viewing area using the player eye gaze data and triggering a control command to the display controller 52 to dynamically update the rendering of the viewing area based on the player eye gaze data. In response to the control command, the display controller 52 controls the display device 12, 14 in real-time or near real-time using the graphics processor to dynamically update the rendering of the viewing area in real-time or near real-time to navigate to the second portion of the interactive game environment, wherein the update comprises a graphical animation effect displayed on the display device representative of navigating to the second portion of the interactive game environment, the update based on the player eye gaze data. In response to an outcome of the interactive game, the card reader updates the monetary amount. A player may use their eye gaze, eye gestures, head movement, body movement, or any combination thereof to navigate through the interactive game environment, change the camera angle on a visible game component, and reveal objects in the interactive game environment that may not be in the viewing area.

Figure 13:
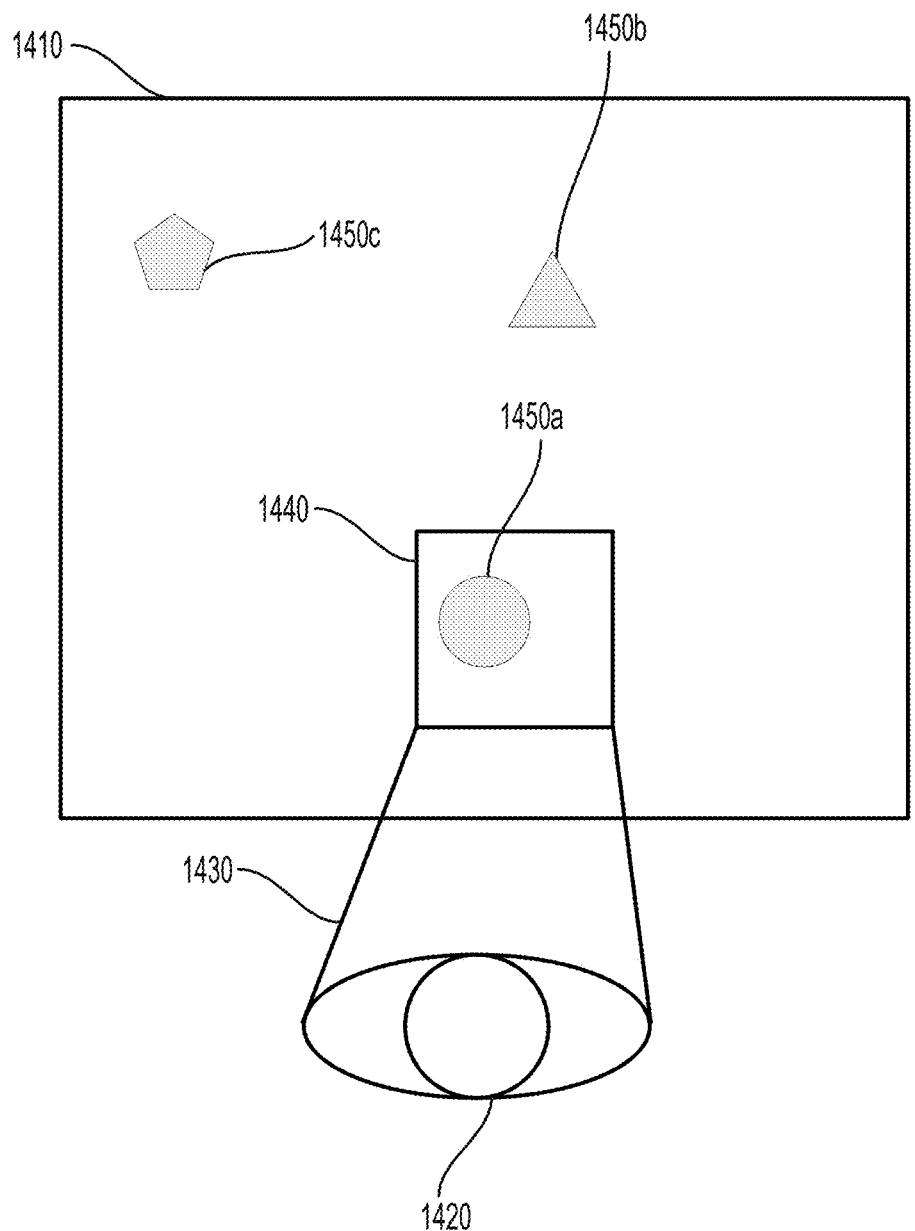
FIGS. 13 and 14 are schematic diagrams that illustrate navigating from one portion of the interactive game environment to a second portion of the interactive game environment according to some embodiments.
Figure 14:
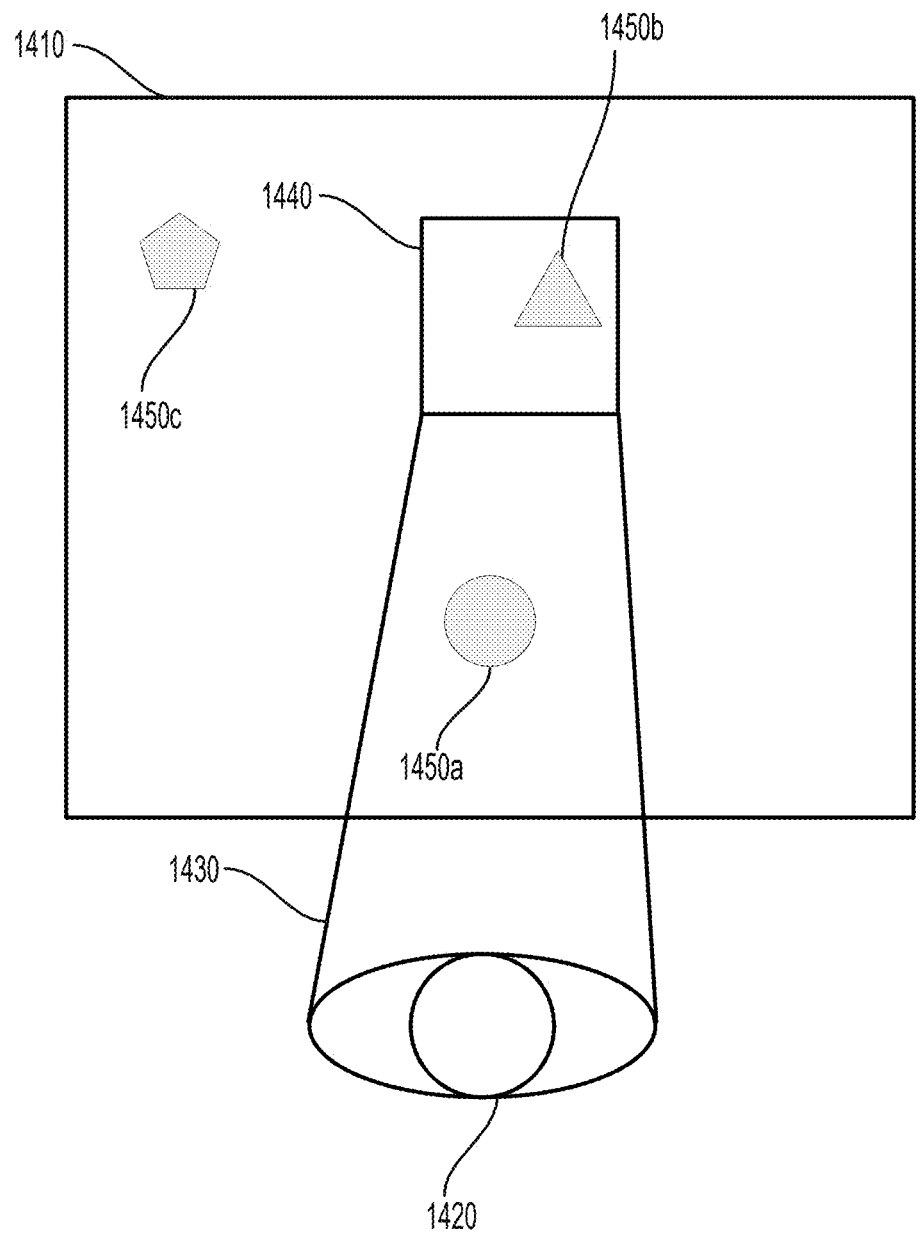

For example, as illustrated in FIG. 13 and FIG. 14, the graphical animation effect displayed on the display device 12, 14 may represent a smooth sliding transition from the first portion of the interactive game environment to the second portion of the interactive game environment. Graphics processor 54 may generate interactive game environment 1410 in accordance with a set of game rules using the game data for one or more interactive games stored in at least one data storage device. Interactive game environment 1410 may include one or more visible game components. In FIG. 13 and FIG. 14, three visible game components 1450*a*, 1450*b*, and 1450*c* are shown, but there may be more or less visible game components based on the game data of the one or more interactive games. Graphics processor 54 may define a viewing area 1440 as a first portion of the interactive game environment. In FIG. 13, the viewing area 1440 includes visible game component 1450a. Display device 12, 14 may display viewing area 1440. Display controller 52 may control rendering of the viewing area on the display device 12, 14 using the graphics processor 54. Game controller 44 may process player eye gaze data collected from the at least one data capture camera device to determine that the eye gaze of the player 1430 may be focused on visible game component 1450a. As illustrated in FIG. 13, player 1420 may view visible game component 1450a on display device 12, 14. Player 1420 may wish to navigate to another area of the interactive game environment 1410. Game controller 44 may determine that the location of the eye gaze of the player relative to the viewing area has changed. For example, the player 1420 may be looking at the top portion of display device 12, 14. Based on this change of location of the eye gaze 1430, game controller 44 may trigger a control command to the display controller 52 to dynamically update the rendering of the viewing area 1440. Display controller 52 may update the rendering of the viewing area 1440 in real-time or near real-time to navigate to the second portion of the interactive game environment 1410. A graphical animation effect, such as a sliding animation effect, may be used to transition from the viewing area 1440 comprising a first portion of the interactive game environment 1410 to the viewing area 1440 comprising a second portion of the interactive game environment. As shown in FIG. 14, the viewing area 1440 is a second portion of the interactive game environment 1410 that is different from the first portion of the interactive game environment. The viewing area 1440 comprising the second portion of the interactive game environment 1410 contains visible game component 1450b. Since the viewing area 1440 is displayed on display device 12, 14, from the perspective of player 1420, the player's eye gaze has caused a transition from a first portion of the interactive game environment 1410 to a second portion of the interactive game environment 1410. The effect of the eye gaze of the player may be to navigate the interactive game environment 1410. The player 1420 was looking at visible game component 1450a, and through navigation of the interactive game environment 1410, the player 1420 discovered visible game component 1450b. This may create the effect that the display device 12, 14 is an infinitely large screen.

As another example, one or more visible game components 1450 may be within a viewing area 1440 and displayed on display device 12, 14 with a certain camera angle or view angle. The game controller 44 may process collected player eye gaze data and trigger a control command to display controller 52 to update the rendering of the viewing area 1440 in real-time or near real-time to display a graphical animation effect representative of changing the camera angle or view angle. From the perspective of player 1420, the graphical animation effect may appear to be a rotation of the one or more visible game components 1450 on display device 12, 14.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

2. The electronic gaming machine of claim 1, wherein the display controller controls the display device to display a plurality of calibration symbols, wherein the at least one data capture camera device monitors calibration eye gaze of the player in relation to the calibration symbols to collect calibration data, and wherein the game controller calibrates the at least one data capture camera device and the display device based on the calibration data for the continuous monitoring.

3. The electronic gaming machine of claim 1, wherein the player eye gaze data comprises a position and a focus, the position defined as coordinates of the player's eyes relative to the display device, the focus defined as a line of sight of the player's eyes relative to the display device.

4. The electronic gaming machine of claim 1, wherein the game controller determines the location of the eye gaze of the player relative to the viewing area by identifying coordinates on the display device corresponding to the player eye gaze data and mapping the coordinates to the viewing area.

5. The electronic gaming machine of claim 1, wherein the display controller renders a gaze-sensitive user interface on the display device, wherein the game controller detects the location of the eye gaze of the player relative to the gaze-sensitive user interface using the player eye gaze data, and triggers the display controller to dynamically update the rendering of the gaze-sensitive user interface to provide a real-time or near real-time graphical animation effect displayed on the display device representative of a visual update to the gaze-sensitive user interface.

6. The electronic gaming machine of claim 1, wherein the graphics processor generates left and right eye images based on a selected three-dimensional intensity level, wherein the display device is a stereoscopic display device, and wherein the game controller triggers the control command to the display controller to dynamically update the rendering of the of the left and right eye images based on the player eye gaze data.

7. The electronic gaming machine of claim 1, wherein the graphical animation effect and the visual update focuses on a portion of the visible game components and blurs another portion of the visible game elements.

8. The electronic gaming machine of claim 1, wherein the viewing area has a plurality of invisible game components, and wherein the graphical animation effect and the visual update renders visible at least a portion of the invisible game components.

9. The electronic gaming machine of claim 1, wherein the graphical animation effect and the visual update distorts a portion of the viewing area, distorts a portion of the visible game components, displays at least a portion of the visible game components in greater detail or higher resolution, magnifies a portion of the visible game components or hides a portion of the visible game components.

10. The electronic gaming machine of claim 1, wherein the graphical animation effect and the visual update selects a portion of the visible game components or is representative of a magnetic attraction towards the location of the eye gaze of the player relative to the viewing area.

11. The electronic gaming machine of claim 1, wherein the at least one data capture camera device continuously monitors an eye gesture of the player to collect player eye gesture data, and wherein the game controller triggers the control command to the display controller to dynamically update the rendering of the viewing area based on the player eye gesture data using the graphical animation effect to update the visible game components in the viewing area.

12. The electronic gaming machine of claim 1, further comprising, a card reader to identify a monetary amount conveyed by a token to the electronic gaming machine, wherein in response to an outcome of the interactive game, the card reader updates the monetary amount using the token.

13. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the game controller predicts the location of the eye gaze of the player relative to the viewing area at a future time using the player eye gaze data and historical data from the same or other players to facilitate dynamic predictive update of the rendering of the viewing area.

14. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the at least one data capture camera device continuously monitors an area proximate to the electronic gaming machine to collect proximity data, wherein the game controller detects a location of the player relative to the electronic gaming machine based on the proximity data, and triggers the display controller to display an advertisement on the display device.

15. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the at least one data storage device stores game data for at least one interactive bonus game, wherein the interactive game environment provides a reel space of a matrix of game symbols, wherein each reel space has a tile behind the reel space, wherein the rendering of the viewing area involves a spin animation of the reel space, and wherein the graphical animation effect involves breaking the tile behind each reel space to trigger the interactive bonus game.

16. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the at least one data storage device stores game data for at least one bonus game, and wherein the game controller triggers the control command to the display controller to transition from the interactive game to the at least one bonus game based on player eye gaze data using the graphical animation effect.

17. An electronic gaming machine comprising:
at least one data storage device to store game data for an interactive game;
a graphics processor to generate an interactive game environment in accordance with the game data and define a viewing area as a subset of the interactive game environment, the viewing area with a plurality of visible game components;
a display device to display, via a user interface, the viewing area with the plurality of visible game components;
a display controller to control rendering of the viewing area on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update to manipulate the display of at least one of the plurality of visible game components in the viewing area, the visual update based on the player eye gaze data;
wherein the at least one data capture camera device continuously monitors player movement to collect player movement data, wherein the game controller detects the player movement relative to the viewing area using the player movement data, and triggers the control command to the display controller to dynamically update the rendering of the viewing area based on the player movement data using the graphical animation effect to update the visible game components in the viewing area.

18. The electronic gaming device of claim 17, wherein the player movement data is associated with at least one of movement of the player's head, movement of a part of the player's body, and a gesture by the player.

19. An electronic gaming machine comprising:
a card reader to identify a monetary amount conveyed by a token to the electronic gaming machine;
at least one data storage device to store game data for a plurality of interactive games;
a graphics processor to generate an interactive game environment using the game data and define a viewing area as a subset of the interactive game environment, the viewing area having one or more game selector symbols for the plurality of interactive games;
a display device to display via a user interface the viewing area having the one or more game selector symbols;
a display controller to control rendering of the viewing area of the selected game on the display device using the graphics processor;
at least one data capture camera device to continuously monitor eye gaze of a player to collect player eye gaze data;
a game controller for determining a location of the eye gaze of the player relative to the viewing area using the player eye gaze data and triggering a control command to the display controller to dynamically update the rendering of the viewing area based on the player eye gaze data; and
in response to the control command, the display controller controls the display device in real-time or near real-time using the graphics processor to dynamically update the rendering of the viewing area to provide a real-time or near real-time graphical animation effect displayed on the display device representative of a visual update corresponding to selecting one of the game selector symbols in the viewing area and displaying a selected interactive game for the selected game selector symbol, the visual update based on the player eye gaze data; and
in response to an outcome of the selected interactive game, the card reader updates the monetary amount using the token
wherein the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

20. An electronic gaming machine comprising:
a card reader to identify a monetary amount conveyed by a token to the electronic gaming machine;

at least one data storage device to store game data for an interactive game;

a graphics processor to generate an interactive game environment using the game data and define a viewing area as a first portion of the interactive game environment, the viewing area representing a virtual camera view of the interactive game environment;

a display device to display via a user interface the viewing area;

a display controller to control rendering of the viewing area on the display device using the graphics processor;

at least one data capture camera device to continuously monitor eye gaze of a player to collect player eye gaze data;

a game controller for determining a location of the eye gaze of the player relative to the viewing area using the player eye gaze data and triggering a control command to the display controller to dynamically update the rendering of the viewing area based on the player eye gaze data; and in response to the control command, the display controller controls the display device in real-time or near real-time using the graphics processor to dynamically update the rendering of the viewing area in real-time or near real-time to navigate to a second portion of the interactive game environment, wherein the update comprises a graphical animation effect displayed on the display device representative of navigating from the first portion to the second portion of the interactive game environment, the update based on the player eye gaze data; and in response to an outcome of the interactive game, the card reader updates the monetary amount using the token;

wherein the game controller defines a filter movement threshold, wherein the game controller, prior to determining the location of the eye gaze of the player relative to the viewing area and triggering the control command to the display controller to dynamically update the rendering of the viewing area, determines that the player eye gaze meets the filter movement threshold.

* * * * *